(12) United States Patent
Jang et al.

(10) Patent No.: US 12,510,733 B2
(45) Date of Patent: Dec. 30, 2025

(54) OPTICAL IMAGING SYSTEM

(71) Applicant: SAMSUNG ELECTRO-MECHANICS CO., LTD., Suwon-si (KR)

(72) Inventors: Dong Hyuk Jang, Suwon-si (KR); Ji Su Lee, Suwon-si (KR); Il Yong Park, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 534 days.

(21) Appl. No.: 17/974,921

(22) Filed: Oct. 27, 2022

(65) Prior Publication Data

US 2023/0384560 A1     Nov. 30, 2023

(30) Foreign Application Priority Data

May 31, 2022  (KR) .................. 10-2022-0066782

(51) Int. Cl.
*G02B 9/64*     (2006.01)
*G02B 13/18*    (2006.01)

(52) U.S. Cl.
CPC .............. *G02B 9/64* (2013.01); *G02B 13/18* (2013.01)

(58) Field of Classification Search
None
See application file for complete search history.

(56) References Cited

U.S. PATENT DOCUMENTS

| 11,460,677 B2 | 10/2022 | Zhang et al. |
| 2019/0146184 A1 | 5/2019 | Xu et al. |
| 2020/0271897 A1* | 8/2020 | Huh ................... G02B 9/64 |
| 2021/0041674 A1 | 2/2021 | Kuo et al. |
| 2021/0048638 A1* | 2/2021 | Chen .................. G02B 9/64 |
| 2021/0149162 A1 | 5/2021 | Jhang et al. |
| 2021/0149166 A1 | 5/2021 | Zhang et al. |
| 2021/0382273 A1 | 12/2021 | Park et al. |
| 2022/0057604 A1 | 2/2022 | Son et al. |
| 2022/0137349 A1 | 5/2022 | Wang et al. |
| 2022/0163770 A1 | 5/2022 | Jhang et al. |
| 2022/0163776 A1* | 5/2022 | Chen ............ G02B 13/0045 |

FOREIGN PATENT DOCUMENTS

| CN | 214895987 U | * 11/2021 | ......... G02B 13/0015 |
| JP | 2022-73865 A | 5/2022 | |
| TW | 202119085 A | 5/2021 | |
| TW | 202119088 A | 5/2021 | |
| TW | I739599 B | 9/2021 | |
| TW | I751905 B | 1/2022 | |
| TW | 202221374 A | 6/2022 | |

OTHER PUBLICATIONS

Taiwanese Office Action Issued on Apr. 27, 2023, in Counterpart Taiwanese Patent Application No. 111141165 (12 Pages in English, 15 Pages in Chinese).

* cited by examiner

*Primary Examiner* — Shan Liu
(74) *Attorney, Agent, or Firm* — NSIP Law

(57) ABSTRACT

An optical imaging system includes a first lens, a second lens, a third lens, a fourth lens, a fifth lens, a sixth lens, and a seventh lens disposed in sequence to be spaced apart from an object side. The second lens, the fourth lens, and the fifth lens have a refractive index of 1.6 or more, and the optical imaging system satisfies the following conditional expression: OAL/2IMH<0.6, where OAL is a distance from an object-side surface of the first lens to an image plane, and 2IMH is a diagonal length of the image plane.

19 Claims, 16 Drawing Sheets

OPTICAL IMAGING SYSTEM

CROSS-REFERENCE TO RELATED APPLICATIONS

This application claims the benefit under 35 USC 119(a) of Korean Patent Application No. 10-2022-0066782 filed on May 31, 2022, in the Korean Intellectual Property Office, the entire disclosure of which is incorporated herein by reference for all purposes.

BACKGROUND

1. Field

The present disclosure relates to an optical imaging system including seven lenses.

2. Description of the Background

A small-sized camera may be mounted in a portable terminal. Small-sized cameras may be used for various purposes such as outdoor scenery pictures, indoor portrait pictures, and the like, and thus may be required to have degrees of performance comparable to those of ordinary cameras. For example, for high resolution and high performance of a camera for a portable terminal, a size of a sensor and an overall length of a lens may be increased. In contrast, a portable terminal be relatively small and light. Small-sized cameras are restricted in mounting space due to sizes of portable terminals, and thus there may be a limit in implementing high performance. Therefore, development of a high-resolution and high-performance optical imaging system having a reduced thickness may be desired.

The above information is presented as background information only to assist with an understanding of the present disclosure. No determination has been made, and no assertion is made, as to whether any of the above might be applicable as prior art with regard to the disclosure.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an optical imaging system includes a first lens, a second lens, a third lens, a fourth lens, a fifth lens, a sixth lens, and a seventh lens disposed in sequence to be spaced apart from an object side. The second lens, the fourth lens, and the fifth lens have a refractive index of 1.6 or more, and the optical imaging system satisfies the following conditional expression: OAL/2IMH<0.6, where OAL is a distance from an object-side surface of the first lens to an image plane, and 2IMH is a diagonal length of the image plane.

The second lens, the fourth lens, and the fifth lens may have negative refractive power.

The second lens may have a convex object-side surface, and a concave image-side surface, and the optical imaging system may satisfy the following conditional expression: $-10<f2/f<0$, where f2 is a focal length of the second length, and f is an overall focal length of the optical imaging system.

The optical imaging system may satisfy the following conditional expressions: $0<f1/f<1.4$ and $0<f1/f3<0.4$, where f1 is a focal length of the first lens, f is an overall focal length of the optical imaging system, and f3 is a focal length of the third lens.

The optical imaging system may satisfy the following conditional expression: $-10<f4/f<0$, where f4 is a focal length of the fourth length, and f is an overall focal length of the optical imaging system.

The sixth lens may have a convex object-side surface, and the optical imaging system may satisfy the following conditional expression: $0<f6/f<1.5$, where f6 is a focal length of the sixth length, and f is an overall focal length of the optical imaging system.

The seventh lens may have a convex object-side surface and a concave image-side surface, and the optical imaging system may satisfy the following conditional expression: $-0.95<f7/f<0$, where f7 is a focal length of the seventh length, and f is an overall focal length of the optical imaging system.

The optical imaging system may satisfy the following conditional expression: $15<v1-v6<25$, where v1 is an Abbe number of the first lens, and v6 is an Abbe number of the sixth lens.

The optical imaging system may satisfy the following conditional expressions: $BFL/f<0.3$ and $D1/f<0.1$, where BFL is a distance from an image-side surface of the seventh lens to an image plane, f is an overall focal length of the optical imaging system, and D1 is a distance from an image-side surface of the first lens to an object-side surface of the second lens.

The optical imaging system may satisfy the following conditional expression: $FOV*2IMH/f<170°$, where FOV is a field of view of the optical imaging system, 2IMH is a diagonal length of an image plane, and f is an overall focal length of the optical imaging system.

In another general aspect, an optical imaging system includes a first lens having positive refractive power, a second lens having negative refractive power, a third lens having positive refractive power, a fourth lens having negative refractive power, a fifth lens having negative refractive power, a sixth lens having positive refractive power, and a seventh lens having negative refractive power, wherein the first to seventh lenses are disposed in sequence to be spaced apart from an object side, and wherein the optical imaging system satisfies the following conditional expression: $OAL/2IMH<0.6$, where OAL is a distance from an object-side surface of the first lens to an image plane, and 2IMH is a diagonal length of the image plane.

The optical imaging system may satisfy the following conditional expressions: $OAL/f<1.3$ and $D1/f<0.1$, where OAL is a distance from an object-side surface of the first lens to an image plane, f is an overall focal length of the optical imaging system, and D1 is a distance from an image-side surface of the first lens to an object-side surface of the second lens.

The optical imaging system may satisfy the following conditional expressions: $0<f1/f3<0.4$ and $0<f6/f<1.5$, where f1 is a focal length of the first lens, f3 is a focal length of the third lens, f6 is a focal length of the sixth lens, and f is an overall focal length of the optical imaging system.

The second lens, the fourth lens, and the fifth lens may a refractive index of 1.6 or more.

In another general aspect, an optical imaging system includes a first lens, a second lens, a third lens, a fourth lens, a fifth lens, a sixth lens, and a seventh lens disposed in sequence from an object side, wherein the optical imaging system satisfies the following conditional expression: OAL/ 2IMH<0.6, where OAL is a distance from an object-side surface of the first lens to an image plane, and 2IMH is a diagonal length of the image plane, and wherein the optical imaging system satisfies one or more of the following conditional expressions: $0<f1/f3<0.4$ and $OAL/f<1.3$, where f1 is a focal length of the first lens, f3 is a focal length of the third lens, and f is an overall focal length of the optical imaging system.

The second lens, the fourth lens, and the fifth lens may have a refractive index of 1.6 or more.

The optical imaging system may satisfy the following conditional expression: $-0.6<f1/f2<0$, where f1 is a focal length of the first lens and f2 is a focal length of the second lens.

The second lens may have a convex object-side surface and a concave image-side surface, the third lens may have a convex object-side surface, and the seventh lens may have a convex object-side surface.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
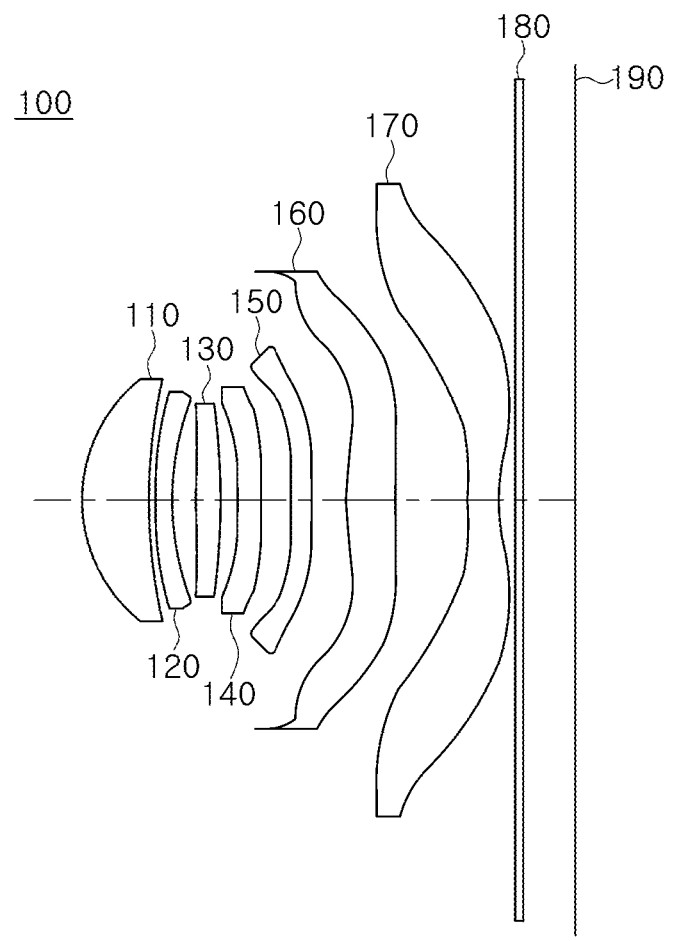
FIG. 1 is a configuration diagram illustrating an optical imaging system according to a first example embodiment of the present disclosure.

Hereinafter, while examples of the present disclosure will be described in detail with reference to the accompanying drawings, it is noted that examples are not limited to the same.

In describing the example embodiments, terms referring to components of the present disclosure are named in consideration of functions of the components, and thus should not be construed as limiting technical components of the present disclosure.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of this disclosure. For example, the sequences of operations described herein are merely examples, and are not limited to those set forth herein, but may be changed as will be apparent after an understanding of this disclosure, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of this disclosure.

Throughout the specification, when an element, such as a layer, region, or substrate is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items; likewise, "at least one of" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms, such as "above," "upper," "below," "lower," and the like, may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above," or "upper" relative to another element would then be "below," or "lower" relative to the other element. Thus, the term "above" encompasses both the above and below orientations depending on the spatial orientation of the device. The device may also be oriented in other ways (rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing. For example, thicknesses, sizes, and shapes of lenses may be exaggerated for description, and in particular, a shape of a spherical or aspherical surface illustrated in the drawings is only presented as an example, but is not limited thereto.

Herein, it is noted that use of the term "may" with respect to an example, for example, as to what an example may include or implement, means that at least one example exists in which such a feature is included or implemented while all examples are not limited thereto.

The features of the examples described herein may be combined in various ways as will be apparent after an understanding of this disclosure. Further, although the examples described herein have a variety of configurations, other configurations are possible as will be apparent after an understanding of this disclosure.

An aspect of the present disclosure may provide a high-resolution optical imaging system having a reduced thickness compared to a conventional high-resolution optical imaging system.

An optical imaging system according to an example embodiment of the present disclosure may include seven lenses disposed along an optical axis.

For example, the optical imaging system may include a first lens, a second lens, a third lens, a fourth lens, a fifth lens, a sixth lens, and a seventh lens disposed in sequence from an object side.

In the present specification, a first lens refers to a lens closest to an object (or a subject), and a seventh lens refers to a lens closest to an imaging plane (or an image sensor).

In addition, in each lens, a first surface refers to a surface closest to an object side (or an object-side surface), and a second surface refers to a surface closest to an image side (or an image-side surface).

In addition, in the present specification, units of a radius of curvature, a thickness, OAL (a distance from an object-side surface of the first lens to an image plane), BFL (a distance from an image-side surface of the seventh lens to the image plane), focus distance (f), and IMH (½ of a diagonal length of the image plane) may be indicated in millimeters (mm), and a unit of FOV (a field of view of the optical imaging system) may be indicated in degrees)(°.

In addition, in the description of each lens in the present specification, one surface that is convex means that a paraxial region (a narrow region in vicinity of and including an optical axis) of the surface is convex, and one surface that is concave means that the paraxial region of the surface is concave. Therefore, even when it is described that one surface of the lens is convex, an edge portion of the lens may be concave. Similarly, even when it is described that one surface of the lens is concave, the edge portion of the lens may be convex.

The optical imaging system according to an example embodiment of the present disclosure may not only be seven lenses, but may further include other components, as necessary.

For example, the optical imaging system may further include an image sensor for converting an incident image of a subject into an electrical signal.

In addition, the optical imaging system may further include an infrared cut-off filter (hereinafter referred to as a filter) for blocking infrared light. The filter may be disposed between the image sensor and a lens disposed closest to the image sensor (for example, the seventh lens). While the filter is described as an infrared cut-off filter for blocking infrared light, the filter is not necessarily limited thereto and may be, for example, a filter for blocking other wavelengths of light such as an ultraviolet light filter for blocking ultraviolet light.

In addition, the optical imaging system may further include an aperture for adjusting an amount of light. For example, the aperture may be disposed between the second lens and the third lens.

The first to seventh lenses included in the optical imaging system according to an example embodiment of the present disclosure may be formed of a plastic material.

In addition, at least one of the first to seventh lenses included in the optical imaging system according to an example embodiment of the present disclosure may have an aspherical surface. Alternatively, each of the first to seventh lenses may have at least one aspherical surface. That is, at least one of the first and second surfaces of the first to seventh lenses may be an aspherical surface. Here, aspherical surfaces of the first to seventh lenses may be represented by Equation 1 as below.

$$Z = \frac{cY^2}{1+\sqrt{1-(1+k)c^2Y^2}} + AY^4 + BY^6 + CY^8 + DY^{10} + EY^{12} + FY^{14} + GY^{16} + HY^{18} + JY^{20} + LY^{22} + MY^{24} + NY^{26} + OY^{28} + PY^{30}$$

Equation 1

In Equation 1, "c" is an inverse of a radius of a curvature of a corresponding lens, "k" is a conic constant, "Y" is a distance from a certain point on an aspherical surface to an optical axis, "A" to "H", "J", and "L" to "P" are fourth to thirtieth aspherical constants in sequence, and "Z" (or SAG) is a distance from a certain point on an aspherical surface to an apex of the aspherical surface in an optical axis direction.

The first to seventh lenses included in the optical imaging system according to one or more example embodiments of the present disclosure may have positive/negative/positive/negative/negative/positive/negative refractive power in sequence from the object side. In addition, the second lens, the fourth lens, and the fifth lens may be high refractive lenses having a refractive index of 1.60 or more. In addition, each of the second lens and the fourth lens may have negative refractive power and a refractive index greater than 1.67.

The optical imaging system according to one or more example embodiments of the present disclosure may satisfy at least one of the following conditional expressions.

$0 < f1/f < 1.4$ (Conditional Expression 1)

$25 < v1-v2 < 45$ (Conditional Expression 2)

$25 < v1-v4 < 45$ (Conditional Expression 3)

$15 < v1-v6 < 25$ (Conditional Expression 4)

$-10 < f2/f < 0$ (Conditional Expression 5)

$0 < f3/f < 10$ (Conditional Expression 6)

$-10 < f4/f < 0$ (Conditional Expression 7)

$-15 < f5/f < 0$ (Conditional Expression 8)

$0 < f6/f < 1.5$ (Conditional Expression 9)

$-0.95 < f7/f < 0$ (Conditional Expression 10)

$OAL/f < 1.3$ (Conditional Expression 11)

$-0.6 < f1/f2 < 0$ (Conditional Expression 12)

$0 < f1/f3 < 0.4$ (Conditional Expression 13)

$BFL/f < 0.3$ (Conditional Expression 14)

$D1/f < 0.1$ (Conditional Expression 15)

$OAL/2IMH < 0.6$ (Conditional Expression 16)

$FOV*2IMH/f < 170°$ (Conditional Expression 17)

In the conditional expressions, "f" is an overall focal length of the optical imaging system, "f1" is a focal length of the first lens, "f2" is a focal length of the second lens, "f3" is a focal length of the third lens, "f4" is a focal length of the fourth lens, "f5" is a focal length of the fifth lens, "f6" is a focal length of the sixth lens, and "f7" is a focal length of the seventh lens. In addition, "v1" is an Abbe number of the first lens, "v2" is an Abbe number of the second lens, "v4" is an Abbe number of the fourth lens, and "v6" is an Abbe number of the sixth lens. In addition, "OAL" is a distance from an object-side surface of the first lens to an image plane, "BFL" is a distance from an image-side surface of the seventh lens to the image plane, "D1" is a distance from an image-side surface of the first lens to an object-side surface of the second lens, "IMH" is ½ of a diagonal length of an imaging plane of the image sensor, and "FOV" is a field of view of the optical imaging system.

Conditional Expression 1 may be a condition for limiting proper refractive power of the first lens. When the first lens is outside of a numerical range of Conditional Expression 1, the first lens may increase a focal length of the optical imaging system, making it difficult to miniaturize the optical imaging system.

Conditional Expressions 2 to 4 may be conditions for reducing chromatic aberration of the optical imaging system. When each lens is outside of numerical ranges of Conditional expressions 2 to 4, it may be difficult to correct chromatic aberration.

Conditional Expressions 5 to 10 may be conditions for limiting proper refractive power of the second to seventh lenses. When each lens is outside of numerical ranges of Conditional Expressions 5 to 10, refractive power thereof may be excessively increased or decreased, so that it may be difficult to correct aberration through each lens.

Conditional Expressions 11, 14 and 16 may be conditions for miniaturization of the optical imaging system. When outside of upper limit values of Conditional Expressions 11, 14 and 16, a distance from an object-side surface of the first lens to an image surface may become longer, so that the optical imaging system may be outside of a range of being mountable on the portable terminal.

Conditional Expressions 12 and 13 may be conditions for defining proper focal lengths of the first to third lenses. When the first to third lenses are outside of numerical ranges of Conditional Expressions 12 and 13, the refractive power of any one of the first to third lenses may be excessively increased compared to the refractive power of the other lenses, so that aberration properties may be weakened, and it may be difficult to secure performance.

Conditional Expression 15 may be a condition for reducing longitudinal chromatic aberration through the first lens and the second lens. When the first lens and the second lens are outside of an upper limit value of Conditional Expression 15, it may be difficult to improve longitudinal chromatic aberration caused by an Abbe number deviation between the first lens and the second lens.

Conditional Expression 17 may be a condition for an angle of view and miniaturization of an optical system. When outside of a range of Conditional Expression 17, distortion aberration may be increased, desired FOV may not be secured, and miniaturization may be difficult.

Hereinafter, the first to seventh lenses included in the optical imaging system according to one or more example embodiments of the present disclosure will be described.

The first lens may have positive refractive power and may have a meniscus shape of being convex toward an object. For example, a first surface of the first lens may be convex, and a second surface of the first lens may be concave. In addition, at least one of the first surface and the second surface of the first lens may be an aspherical surface.

The second lens may have negative refractive power and may have a meniscus shape convex toward an object. For example, a first surface of the second lens may be convex, and a second surface of the second lens may be concave. In addition, at least one of the first surface and the second surface of the second lens may be an aspherical surface. In addition, the first lens and the second lens may be formed of a plastic material having different optical properties.

The third lens may have positive refractive power, and may have convex opposite sides. For example, a first surface and a second surface of the third lens may be convex. In addition, at least one of the first surface and the second surface of the third lens may be an aspherical surface. In addition, the second lens and the third lens may be formed of a plastic material having different optical properties.

The fourth lens may have negative refractive power, and may have concave opposite sides. For example, a first surface and a second surface of the fourth lens may be concave. In addition, at least one of the first surface and the second surface of the fourth lens may be an aspherical surface. In addition, the third lens and the fourth lens may be formed of a plastic material having different optical properties.

The fifth lens may have negative refractive power, and may have a meniscus shape of being convex toward an object. For example, a first surface of the fifth lens may be convex and a second surface of the fifth lens may be concave. In addition, at least one of the first surface and the second surface of the fifth lens may be an aspherical surface.

In addition, the fourth lens and the fifth lens may be formed of a plastic material having different optical properties.

The sixth lens may have positive refractive power, and may have a meniscus shape of being convex toward an object. For example, a first surface of the sixth lens may be convex, and a second surface of the sixth lens may be concave. In addition, at least one of the first surface and the second surface of the sixth lens may be an aspherical surface. In addition, at least one inflection point may be formed on at least one of the first surface and the second surface of the sixth lens. In addition, the fifth lens and the sixth lens may be formed of a plastic material having different optical properties.

The seventh lens may have negative refractive power, and may have a meniscus shape of being convex toward an object. For example, a first surface of the seventh lens may be convex, and a second surface of the seventh lens may be concave. In addition, at least one of the first surface and the second surface of the seventh lens may be an aspherical surface. In addition, at least one inflection point may be formed on at least one of the first surface and the second surface of the seventh lens. In addition, the sixth lens and the seventh lens may be formed of a plastic material having different optical properties.

Hereinafter, an optical imaging system according to various example embodiments of the present disclosure will be described.

First, an optical imaging system according to a first example embodiment of the present disclosure will be described with reference to FIGS. 1 and 2.

An optical imaging system 100 according to the first example embodiment of the present disclosure may include a first lens 110, a second lens 120, a third lens 130, a fourth lens 140, a fifth lens 150, a sixth lens 160, and a seventh lens 170.

According to the first example embodiment of the present disclosure, the first lens 110 may have positive refractive power, a first surface of the first lens 110 may be convex in a paraxial region thereof, and a second surface of the first lens 110 may be concave in a paraxial region thereof.

The second lens 120 may have negative refractive power, a first surface of the second lens 120 may be convex in a paraxial region thereof, and a second surface of the second lens 120 may be concave in a paraxial region thereof. The first lens 110 and the second lens 120 may be formed of a plastic material having different optical properties. For example, Abbe numbers of the first lens 110 and the second lens 120 may be different from each other.

The third lens 130 may have positive refractive power, and first and second surfaces of the third lens 130 may be convex in a paraxial region thereof. The second lens 120 and the third lens 130 may be formed of a plastic material having different optical properties. For example, Abbe numbers of the second lens 120 and the third lens 130 may be different from each other.

The fourth lens 140 may have negative refractive power, and first and second surfaces of the fourth lens 140 may be concave in a paraxial region thereof. The third lens 130 and the fourth lens 140 may be formed of a plastic material having different optical properties. For example, Abbe numbers of the third lens 130 and the fourth lens 140 may be different from each other.

The fifth lens 150 may have negative refractive power, a first surface of the fifth lens 150 may be convex in a paraxial region thereof, and a second surface of the fifth lens 150 may be concave in a paraxial region thereof. The fourth lens 140 and the fifth lens 150 may be formed of a plastic material having different optical properties. For example, Abbe numbers of the fourth lens 140 and the fifth lens 150 may be different from each other.

The sixth lens 160 may have positive refractive power, a first surface of the sixth lens 160 may be convex in a paraxial region thereof, and a second surface of the sixth lens 160 may be concave in a paraxial region thereof. In addition, at least one inflection point may be formed on the first surface and the second surface of the sixth lens 160. For example, the first surface of the sixth lens 160 may be convex in the paraxial region thereof, and may be concave toward an edge thereof, and the second surface of the sixth lens 160 may be concave in the paraxial region thereof, and may be convex toward an edge thereof. The fifth lens 150 and the sixth lens 160 may be formed of a plastic material having different optical properties. For example, Abbe numbers of the fifth lens 150 and the sixth lens 160 may be different from each other.

The seventh lens 170 may have negative refractive power, a first surface of the seventh lens 170 may be convex in a paraxial region thereof, and a second surface of the seventh lens 170 may be concave in a paraxial region thereof. In addition, at least one inflection point may be formed on the first surface and the second surface of the seventh lens 170. For example, the first surface of the seventh lens 170 may be convex in the paraxial region thereof, and may be concave toward an edge thereof, and the second surface of the seventh lens 170 may be concave in the paraxial region thereof, and may be convex toward an edge thereof. The sixth lens 160 and the seventh lens 170 may be formed of a plastic material having different optical properties. For example, Abbe numbers of the sixth lens 160 and the seventh lens 170 may be different from each other.

In addition, the optical imaging system 100 according to the first example embodiment of the present disclosure may further include an aperture (not illustrated), a filter 180, and an image sensor 190.

Table 1 shows properties (a radius of curvature, a thickness, a distance between lenses, a refractive index, an Abbe number, and a focal length) of the first to seventh lenses of the optical imaging system according to the first example embodiment of the present disclosure.

TABLE 1

| Surface | Note | Radius | Thickness | Index | Abbe number | Focal length |
|---|---|---|---|---|---|---|
| S1 | Lens 1 | 2.301 | 0.951 | 1.544 | 56.1 | 5.486 |
| S2 | | 8.456 | 0.117 | | | |
| S3 | Lens 2 | 11.447 | 0.230 | 1.680 | 18.4 | −16.551 |
| S4(stop) | | 5.666 | 0.343 | | | |
| S5 | Lens 3 | 26.528 | 0.354 | 1.544 | 56.1 | 29.381 |
| S6 | | −40.455 | 0.242 | | | |
| S7 | Lens 4 | −42.676 | 0.341 | 1.680 | 18.4 | −35.798 |
| S8 | | 58.663 | 0.450 | | | |
| S9 | Lens 5 | 80.957 | 0.300 | 1.614 | 25.9 | −45.404 |
| S10 | | 20.858 | 0.498 | | | |
| S11 | Lens 6 | 4.765 | 0.723 | 1.567 | 38.0 | 9.012 |
| S12 | | 61.184 | 1.020 | | | |
| S13 | Lens 7 | 7.174 | 0.450 | 1.535 | 56.1 | −5.500 |
| S14 | | 2.047 | 0.246 | | | |
| S15 | IR-cut | Infinity | 0.110 | 1.518 | 64.2 | |
| S16 | filter | Infinity | 0.695 | | | |
| S17 | image | Infinity | 0.02 | | | |

An overall focal length f of the optical imaging system according to the first example embodiment of the present disclosure may be 6.281 mm, a field of view (FOV) of the optical imaging system may be 85.3°, OAL may be 7.09 mm, and IMH may be 6.12 mm.

Table 2 shows aspherical surface values of the optical imaging system according to the first example embodiment of the present disclosure. For example, both object-side surfaces and image-side surfaces of the first lens 110 to the seventh lens 170 may be aspherical surfaces.

TABLE 2

| Surface | S1 | S2 | S3 | S4 | S5 | S6 | S7 |
|---|---|---|---|---|---|---|---|
| K | −0.409307 | 10.056847 | 45.312979 | 2.487952 | 0.000000 | −99.00000 | 0.000000 |
| A | −0.000831 | −0.021251 | 0.013934 | 0.003484 | −0.054362 | 0.005644 | −0.040486 |
| B | −0.010954 | 0.162071 | −0.154016 | 0.002375 | 0.452113 | −0.280279 | 0.098760 |
| C | 0.173544 | −0.749349 | 0.790108 | −0.132911 | −2.965686 | 1.718362 | −1.349501 |
| D | −0.659641 | 2.137579 | −2.595595 | 0.895481 | 12.544847 | −6.740773 | 7.785785 |
| E | 1.402625 | −4.054826 | 5.860244 | −3.084035 | −35.948148 | 18.053170 | −26.24257 |
| F | −1.934881 | 5.370736 | −9.340511 | 6.849797 | 72.123774 | −34.19915 | 57.747088 |
| G | 1.840203 | −5.105710 | 10.692531 | −10.58036 | −103.43620 | 46.828916 | −87.57875 |
| H | −1.241158 | 3.529421 | −8.872295 | 11.690369 | 107.173166 | −46.86642 | 94.047699 |
| J | 0.599314 | −1.776401 | 5.337356 | −9.292762 | −80.289232 | 34.318505 | −72.19316 |
| L | −0.205956 | 0.644008 | −2.302705 | 5.262340 | 43.032344 | −18.19666 | 39.387875 |
| M | 0.049199 | −0.163764 | 0.693938 | −2.067075 | −16.074248 | 6.805614 | −14.92106 |
| N | −0.007766 | 0.027714 | −0.138619 | 0.534197 | 3.971735 | −1.703605 | 3.731181 |
| O | 0.000728 | −0.002803 | 0.016485 | −0.081530 | −0.583065 | 0.256271 | −0.553753 |
| P | −0.000031 | 0.000128 | −0.000883 | 0.005557 | 0.038482 | −0.017522 | 0.036932 |

| | S8 | S9 | S10 | S11 | S12 | S13 | S14 |
|---|---|---|---|---|---|---|---|
| K | 0.000000 | 0.000000 | −34.86867 | −17.66400 | 93.965924 | 1.137637 | −7.792588 |
| A | −0.050269 | −0.080653 | −0.108050 | −0.023087 | −0.005692 | −0.150559 | −0.073145 |
| B | 0.049120 | 0.006428 | 0.064336 | 0.005508 | 0.004115 | 0.067595 | 0.032589 |
| C | −0.068509 | 0.238440 | −0.021088 | −0.004831 | −0.007554 | −0.025527 | −0.011959 |
| D | −0.010117 | −0.796071 | −0.034191 | 0.000100 | 0.005090 | 0.007578 | 0.003314 |
| E | 0.220145 | 1.493697 | 0.074322 | 0.002269 | −0.002315 | −0.001660 | −0.000684 |
| F | −0.441270 | −1.861546 | −0.075697 | −0.001822 | 0.000802 | 0.000267 | 0.000106 |
| G | 0.493580 | 1.621474 | 0.049215 | 0.000773 | −0.000218 | −0.000032 | −0.000012 |
| H | −0.356182 | −1.009019 | −0.021917 | −0.000209 | 0.000046 | 0.000003 | 0.000001 |
| J | 0.170157 | 0.451097 | 0.006838 | 0.000038 | −0.000007 | 0.000000 | 0.000000 |
| L | −0.052262 | −0.143630 | −0.001493 | −0.000005 | 0.000001 | 0.000000 | 0.000000 |
| M | 0.009247 | 0.031740 | 0.000224 | 0.000000 | 0.000000 | 0.000000 | 0.000000 |
| N | −0.000587 | −0.004618 | −0.000022 | 0.000000 | 0.000000 | 0.000000 | 0.000000 |
| O | −0.000070 | 0.000397 | 0.000001 | 0.000000 | 0.000000 | 0.000000 | 0.000000 |
| P | 0.000010 | −0.000015 | 0.000000 | 0.000000 | 0.000000 | 0.000000 | 0.000000 |

Figure 2:
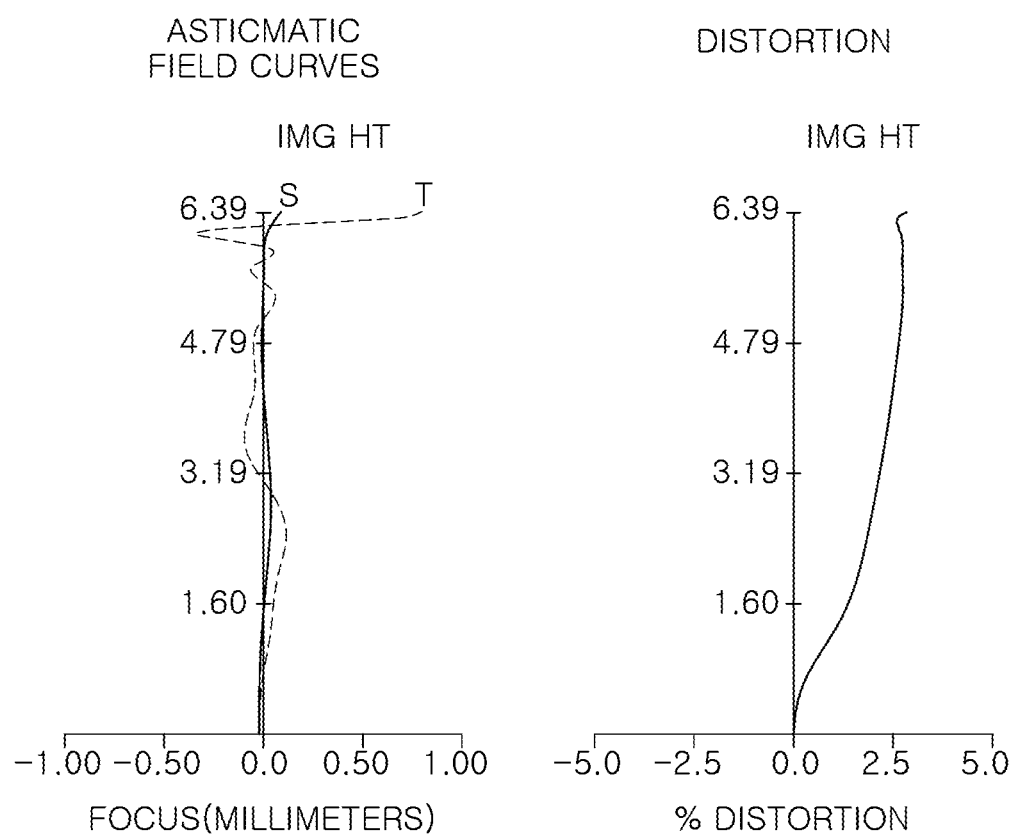
FIG. 2 is a graph illustrating an aberration curve of the optical imaging system illustrated in FIG. 1.

In addition, the optical imaging system according to the first example embodiment of the present disclosure configured as described above may have the aberration properties illustrated in FIG. 2.

Figure 3:
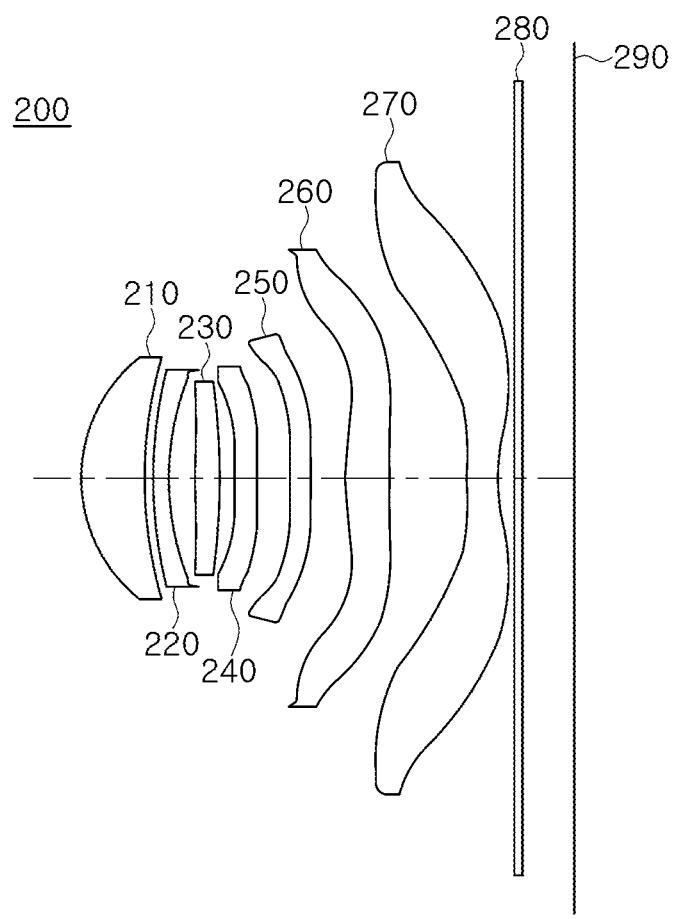
FIG. 3 is a configuration diagram illustrating an optical imaging system according to a second example embodiment of the present disclosure.

Next, an optical imaging system according to a second example embodiment of the present disclosure will be described with reference to FIGS. 3 and 4.

An optical imaging system 200 according to the second example embodiment of the present disclosure may include a first lens 210, a second lens 220, a third lens 230, a fourth lens 240, a fifth lens 250, a sixth lens 260, and a seventh lens 270.

According to the second example embodiment of the present disclosure, the first lens 210 may have positive refractive power, a first surface of the first lens 210 may be convex in a paraxial region thereof, and a second surface of the first lens 210 may be concave in a paraxial region thereof.

The second lens 220 may have negative refractive power, a first surface of the second lens 220 may be convex in a paraxial region thereof, and a second surface of the second lens 220 may be concave in a paraxial region thereof. The first lens 210 and the second lens 220 may be formed of a plastic material having different optical properties. For example, Abbe numbers of the first lens 210 and the second lens 220 may be different from each other.

The third lens 230 may have positive refractive power, and first and second surfaces of the third lens 230 may be convex in a paraxial region thereof. The second lens 220 and the third lens 230 may be formed of a plastic material having different optical properties. For example, Abbe numbers of the second lens 220 and the third lens 230 may be different from each other.

The fourth lens 240 may have negative refractive power, and first and second surfaces of the fourth lens 240 may be concave in a paraxial region thereof. The third lens 230 and the fourth lens 240 may be formed of a plastic material having different optical properties. For example, Abbe numbers of the third lens 230 and the fourth lens 240 may be different from each other.

The fifth lens 250 may have negative refractive power, a first surface of the fifth lens 250 may be convex in a paraxial region thereof, and a second surface of the fifth lens 250 may be concave in a paraxial region thereof. The fourth lens 240 and the fifth lens 250 may be formed of a plastic material having different optical properties. For example, Abbe numbers of the fourth lens 240 and the fifth lens 250 may be different from each other.

The sixth lens 260 may have positive refractive power, a first surface of the sixth lens 260 may be convex in a paraxial region thereof, and a second surface of the sixth lens 260 may be concave in a paraxial region thereof. In addition, at least one inflection point may be formed on the first surface and the second surface of the sixth lens 260. For example, the first surface of the sixth lens 260 may be convex in the paraxial region thereof, and may be concave toward an edge thereof, and the second surface of the sixth lens 260 may be concave in the paraxial region thereof, and may be convex toward an edge thereof. The fifth lens 250 and the sixth lens 260 may be formed of a plastic material having different optical properties. For example, Abbe numbers of the fifth lens 250 and the sixth lens 260 may be different from each other.

The seventh lens 270 may have negative refractive power, a first surface of the seventh lens 270 may be convex in a paraxial region thereof, and a second surface of the seventh lens 270 may be concave in a paraxial region thereof. In addition, at least one inflection point may be formed on the first surface and the second surface of the seventh lens 270. For example, the first surface of the seventh lens 270 may be convex in the paraxial region thereof, and may be concave toward an edge thereof, and the second surface of the seventh lens 270 may be concave in the paraxial region thereof, and may be convex toward an edge thereof.

In addition, the sixth lens 260 and the seventh lens 270 may be formed of a plastic material having different optical properties. For example, Abbe numbers of the sixth lens 260 and the seventh lens 270 may be different from each other.

In addition, the optical imaging system 200 according to the second example embodiment of the present disclosure may further include an aperture (not illustrated), a filter 280, and an image sensor 290.

Table 3 shows properties (a radius of curvature, a thickness, a distance between lenses, a refractive index, an Abbe number, and a focal length) of the first to seventh lenses of the optical imaging system according to the second example embodiment of the present disclosure.

TABLE 3

| Surface | Note | Radius | Thickness | Index | Abbe number | Focal length |
|---|---|---|---|---|---|---|
| S1 | Lens 1 | 2.301 | 0.915 | 1.544 | 56.1 | 5.520 |
| S2 | | 8.349 | 0.112 | | | |
| S3 | Lens 2 | 11.320 | 0.230 | 1.680 | 18.4 | −16.482 |
| S4(stop) | | 5.623 | 0.352 | | | |
| S5 | Lens 3 | 25.682 | 0.357 | 1.544 | 56.1 | 32.058 |
| S6 | | −54.803 | 0.241 | | | |
| S7 | Lens 4 | −30.310 | 0.329 | 1.680 | 18.4 | −41.168 |
| S8 | | 445.299 | 0.450 | | | |
| S9 | Lens 5 | 19.205 | 0.300 | 1.614 | 25.9 | −31.616 |
| S10 | | 9.643 | 0.508 | | | |
| S11 | Lens 6 | 4.128 | 0.671 | 1.567 | 38.0 | 8.335 |
| S12 | | 29.355 | 1.099 | | | |
| S13 | Lens 7 | 7.167 | 0.450 | 1.535 | 56.1 | −5.625 |
| S14 | | 2.079 | 0.249 | | | |
| S15 | IR-cut | Infinity | 0.110 | 1.518 | 64.2 | |
| S16 | filter | Infinity | 0.696 | | | |
| S17 | image | Infinity | 0.02 | | | |

An overall focal length f of the optical imaging system according to the second example embodiment of the present disclosure may be 6.282 mm, a field of view (FOV) of the optical imaging system may be 85.3°, OAL may be 7.09 mm, and IMH may be 6.12 mm.

Table 4 shows aspherical surface values of the optical imaging system according to the second example embodiment of the present disclosure. For example, both object-side surfaces and image-side surfaces of the first lens 210 to the seventh lens 270 may be aspherical surfaces.

TABLE 4

| Surface | S1 | S2 | S3 | S4 | S5 | S6 | S7 |
|---|---|---|---|---|---|---|---|
| K | −0.426363 | 9.800324 | 45.135760 | 2.641703 | 0.000000 | −99.00000 | 0.000000 |
| A | −0.015346 | −0.026028 | 0.008445 | 0.001972 | −0.045548 | −0.025161 | −0.021877 |
| B | 0.084936 | 0.217915 | −0.077869 | 0.048586 | 0.361060 | 0.041954 | −0.107268 |
| C | −0.184601 | −1.049121 | 0.373837 | −0.489241 | −2.394824 | −0.202667 | 0.117745 |
| D | 0.193140 | 3.104755 | −1.197886 | 2.554206 | 10.148808 | 0.546377 | 1.465137 |
| E | 0.021031 | −6.089102 | 2.726011 | −8.143755 | −29.100398 | −0.793469 | −8.514406 |
| F | −0.350485 | 8.301154 | −4.461914 | 17.329687 | 58.471105 | 0.367837 | 23.640103 |
| G | 0.524050 | −8.089381 | 5.289808 | −25.72727 | −84.081211 | 0.787774 | −41.16840 |
| H | −0.440647 | 5.714169 | −4.556641 | 27.232755 | 87.437595 | −1.800374 | 48.673221 |
| J | 0.242896 | −2.932324 | 2.843588 | −20.68183 | −65.782090 | 1.869682 | −40.21007 |
| L | −0.091170 | 1.082220 | −1.269938 | 11.180802 | 35.414679 | −1.198046 | 23.283791 |
| M | 0.023189 | −0.279845 | 0.395131 | −4.197133 | −13.287499 | 0.499712 | −9.274675 |
| N | −0.003835 | 0.048114 | −0.081284 | 1.038988 | 3.297067 | −0.133190 | 2.422448 |
| O | 0.000373 | −0.004939 | 0.009932 | −0.152377 | −0.485920 | 0.020756 | −0.373630 |
| P | −0.000016 | 0.000229 | −0.000546 | 0.010018 | 0.032185 | −0.001449 | 0.025794 |

| | S8 | S9 | S10 | S11 | S12 | S13 | S14 |
|---|---|---|---|---|---|---|---|
| K | 0.000000 | 0.000000 | −50.21475 | −16.521132 | 11.126544 | 1.114274 | −7.792790 |
| A | −0.031760 | −0.087910 | −0.119725 | −0.015402 | −0.002589 | −0.142300 | −0.067131 |
| B | −0.116406 | −0.026464 | 0.098301 | 0.011620 | 0.008933 | 0.062598 | 0.028268 |
| C | 0.829823 | 0.427903 | −0.095836 | −0.024666 | −0.018538 | −0.024268 | −0.010270 |
| D | −3.010154 | −1.275172 | 0.091632 | 0.022683 | 0.014807 | 0.007346 | 0.002900 |
| E | 6.843879 | 2.236854 | −0.072671 | −0.013103 | −0.007515 | −0.001601 | −0.000630 |

TABLE 4-continued

| | | | | | | |
|---|---|---|---|---|---|---|
| F | −10.58691 | −2.621943 | 0.044413 | 0.005140 | 0.002673 | 0.000251 | 0.000105 |
| G | 11.586786 | 2.148260 | −0.020623 | −0.001409 | −0.000689 | −0.000029 | −0.000014 |
| H | −9.141327 | −1.255822 | 0.007271 | 0.000271 | 0.000130 | 0.000002 | 0.000001 |
| J | 5.222478 | 0.526563 | −0.001943 | −0.000036 | −0.000018 | 0.000000 | 0.000000 |
| L | −2.141581 | −0.157015 | 0.000390 | 0.000003 | 0.000002 | 0.000000 | 0.000000 |
| M | 0.614551 | 0.032460 | −0.000057 | 0.000000 | 0.000000 | 0.000000 | 0.000000 |
| N | −0.117170 | −0.004415 | 0.000006 | 0.000000 | 0.000000 | 0.000000 | 0.000000 |
| O | 0.013334 | 0.000355 | 0.000000 | 0.000000 | 0.000000 | 0.000000 | 0.000000 |
| P | −0.000685 | −0.000013 | 0.000000 | 0.000000 | 0.000000 | 0.000000 | 0.000000 |

Figure 4:
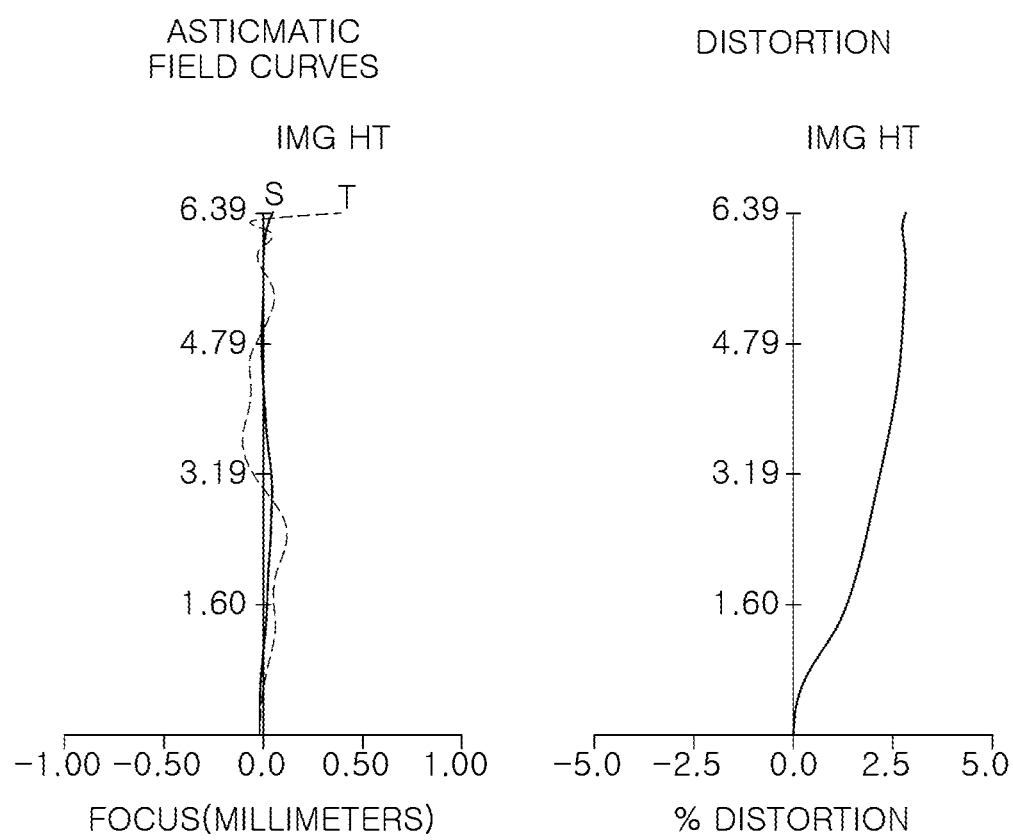
FIG. 4 is a graph illustrating an aberration curve of the optical imaging system illustrated in FIG. 3.

In addition, the optical imaging system according to the second example embodiment of the present disclosure configured as described above may have the aberration properties illustrated in FIG. 4.

Figure 5:
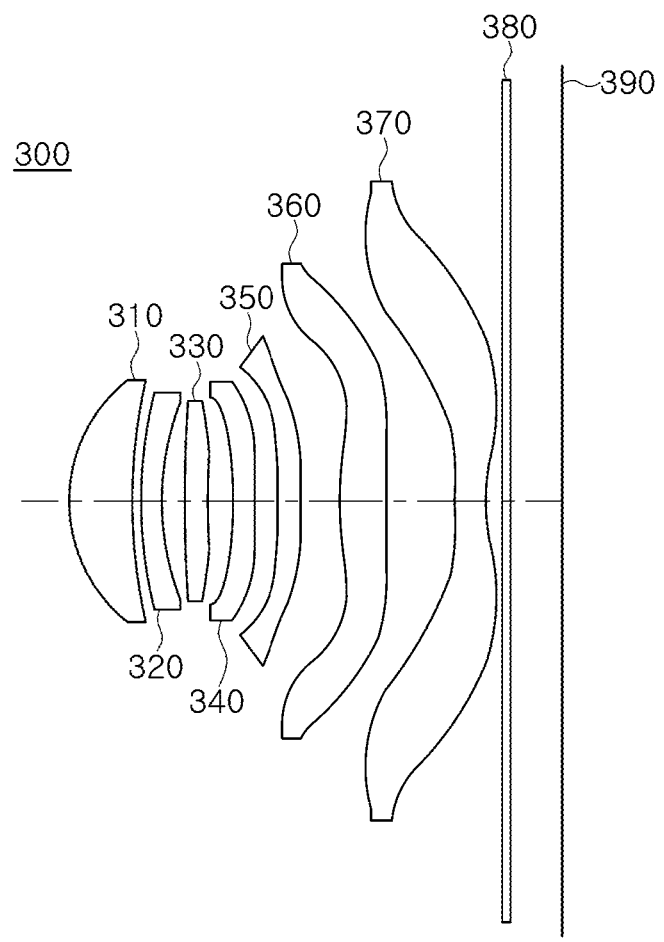
FIG. 5 is a configuration diagram illustrating an optical imaging system according to a third example embodiment of the present disclosure.

Next, an optical imaging system according to a third example embodiment of the present disclosure will be described with reference to FIGS. 5 and 6.

An optical imaging system 300 according to the third example embodiment of the present disclosure may include a first lens 310, a second lens 320, a third lens 330, a fourth lens 340, a fifth lens 350, a sixth lens 360, and a seventh lens 370.

According to the third example embodiment of the present disclosure, the first lens 310 may have positive refractive power, a first surface of the first lens 310 may be convex in a paraxial region thereof, and a second surface of the first lens 310 may be concave in a paraxial region thereof.

The second lens 320 may have negative refractive power, a first surface of the second lens 320 may be convex in a paraxial region thereof, and a second surface of the second lens 320 may be concave in a paraxial region thereof. The first lens 310 and the second lens 320 may be formed of a plastic material having different optical properties. For example, Abbe numbers of the first lens 310 and the second lens 320 may be different from each other.

The third lens 330 may have positive refractive power, a first surface of the third lens 330 may be convex in a paraxial region thereof, and a second surface of the third lens 330 may be concave in a paraxial region thereof. The second lens 320 and the third lens 330 may be formed of a plastic material having different optical properties. For example, Abbe numbers of the second lens 320 and the third lens 330 may be different from each other.

The fourth lens 340 may have negative refractive power, and first and second surfaces of the fourth lens 340 may be concave in a paraxial region thereof. The third lens 330 and the fourth lens 340 may be formed of a plastic material having different optical properties. For example, Abbe numbers of the third lens 330 and the fourth lens 340 may be different from each other.

The fifth lens 350 may have negative refractive power, a first surface of the fifth lens 350 may be convex in a paraxial region thereof, and a second surface of the fifth lens 350 may be concave in a paraxial region thereof. The fourth lens 340 and the fifth lens 350 may be formed of a plastic material having different optical properties. For example, Abbe numbers of the fourth lens 340 and the fifth lens 350 may be different from each other.

The sixth lens 360 may have positive refractive power, and first and second surfaces of the sixth lens 360 may be convex in a paraxial region thereof. In addition, at least one inflection point may be formed on the first surface and the second surface of the sixth lens 360. For example, the first and second surfaces of the sixth lens 360 may be convex in the paraxial region thereof, and may be concave toward an edge thereof. The fifth lens 350 and the sixth lens 360 may be formed of a plastic material having different optical properties. For example, Abbe numbers of the fifth lens 350 and the sixth lens 360 may be different from each other.

The seventh lens 370 may have negative refractive power, a first surface of the seventh lens 370 may be convex in a paraxial region thereof, and a second surface of the seventh lens 370 may be concave in a paraxial region thereof. In addition, at least one inflection point may be formed on the first surface and the second surface of the seventh lens 370. For example, the first surface of the seventh lens 370 may be convex in the paraxial region thereof, and may be concave toward an edge thereof, and the second surface of the seventh lens 370 may be concave in the paraxial region thereof, and may be convex toward an edge thereof. The sixth lens 360 and the seventh lens 370 may be formed of a plastic material having different optical properties. For example, Abbe numbers of the sixth lens 360 and the seventh lens 370 may be different from each other.

In addition, the optical imaging system 300 according to the third example embodiment of the present disclosure may further include an aperture (not illustrated), a filter 380, and an image sensor 390.

Table 5 shows properties (a radius of curvature, a thickness, a distance between lenses, a refractive index, an Abbe number, and a focal length) of the first to seventh lenses of the optical imaging system according to the third example embodiment of the present disclosure.

TABLE 5

| Surface | Note | Radius | Thickness | Index | Abbe number | Focal length |
|---|---|---|---|---|---|---|
| S1 | Lens 1 | 2.363 | 0.920 | 1.544 | 56.1 | 5.830 |
| S2 | | 7.893 | 0.136 | | | |
| S3 | Lens 2 | 10.065 | 0.280 | 1.680 | 18.4 | −16.635 |
| S4 | | 5.299 | 0.340 | | | |
| S5(stop) | Lens 3 | 11.112 | 0.345 | 1.544 | 56.1 | 27.783 |
| S6 | | 43.031 | 0.327 | | | |
| S7 | Lens 4 | −53.812 | 0.337 | 1.680 | 18.4 | −31.817 |
| S8 | | 37.099 | 0.333 | | | |
| S9 | Lens 5 | 25.587 | 0.336 | 1.614 | 25.9 | −86.811 |

TABLE 5-continued

| Surface | Note | Radius | Thickness | Index | Abbe number | Focal length |
|---|---|---|---|---|---|---|
| S10 | | 17.255 | 0.567 | | | |
| S11 | Lens 6 | 4.360 | 0.681 | 1.567 | 38.0 | 7.635 |
| S12 | | −8388.930 | 1.048 | | | |
| S13 | Lens 7 | 8.586 | 0.387 | 1.535 | 56.1 | −4.589 |
| S14 | | 1.885 | 0.206 | | | |
| S15 | IR-cut | Infinity | 0.110 | 1.518 | 64.2 | |
| S16 | filter | Infinity | 0.756 | | | |
| S17 | image | Infinity | −0.02 | | | |

An overall focal length f of the optical imaging system according to the third example embodiment of the present disclosure may be 6.330 mm, a field of view (FOV) of the optical imaging system may be 85.3°, OAL may be 7.09 mm, and IMH may be 6.12 mm.

Table 6 shows aspherical surface values of the optical imaging system according to the third example embodiment of the present disclosure. For example, both object-side surfaces and image-side surfaces of the first lens 310 to the seventh lens 370 may be aspherical surfaces.

TABLE 6

| Surface | S1 | S2 | S3 | S4 | S5 | S6 | S7 |
|---|---|---|---|---|---|---|---|
| K | −0.508312 | −1.432168 | 17.341652 | 5.396631 | −3.257960 | −96.07131 | 91.651612 |
| A | 0.002519 | −0.009610 | −0.015944 | −0.014076 | −0.016758 | −0.028896 | 0.039855 |
| B | 0.014526 | 0.023833 | 0.005106 | 0.030374 | −0.002958 | 0.107876 | 0.009309 |
| C | −0.043741 | −0.081841 | 0.062113 | −0.127949 | −0.018323 | −0.849486 | −0.121835 |
| D | 0.097699 | 0.219937 | −0.259941 | 0.571638 | 0.219159 | 3.920637 | 0.726024 |
| E | −0.156137 | −0.405370 | 0.640483 | −1.741580 | −0.940164 | −11.740767 | 2.585287 |
| F | 0.181616 | 0.521789 | −1.060672 | 3.626892 | 2.327128 | 23.950095 | 5.794260 |
| G | −0.154998 | −0.478533 | 1.228787 | −5.288707 | −3.767295 | −34.30838 | −8.674773 |
| H | 0.097305 | 0.315746 | −1.014837 | 5.486000 | 4.200641 | 35.089057 | 8.986701 |
| J | −0.044740 | −0.149813 | 0.600839 | −4.067374 | −3.291320 | −25.73562 | −6.541679 |
| L | 0.014857 | 0.050505 | −0.253045 | 2.139056 | 1.811290 | 13.424378 | 3.340134 |
| M | −0.003464 | −0.011766 | 0.073972 | −0.779028 | −0.685924 | −4.858961 | −1.171804 |
| N | 0.000537 | 0.001794 | −0.014260 | 0.186768 | 0.170231 | 1.159485 | 0.269046 |
| O | −0.000050 | −0.000161 | 0.001629 | −0.026505 | −0.024923 | −0.163979 | −0.036399 |
| P | 0.000002 | 0.000006 | −0.000083 | 0.001686 | 0.001631 | 0.010407 | 0.002199 |

| | S8 | S9 | S10 | S11 | S12 | S13 | S14 |
|---|---|---|---|---|---|---|---|
| K | 34.117490 | −49.72908 | 18.518524 | −17.63180 | 99.000000 | −7.654033 | −9.767822 |
| A | −0.047122 | −0.093204 | −0.117260 | −0.016905 | −0.009324 | −0.234584 | −0.115277 |
| B | 0.038348 | 0.048426 | 0.073602 | 0.009756 | 0.015719 | 0.156480 | 0.071324 |
| C | −0.026633 | 0.080284 | −0.025410 | −0.015405 | −0.015822 | −0.073691 | −0.030062 |
| D | −0.138055 | −0.309090 | −0.035649 | 0.012617 | 0.008521 | 0.024290 | 0.008791 |
| E | 0.522401 | 0.508077 | 0.073284 | −0.007651 | −0.003287 | −0.005615 | −0.001838 |
| F | −0.972709 | −0.526423 | −0.066765 | 0.003461 | 0.000994 | 0.000929 | 0.000281 |
| G | 1.166396 | 0.372394 | 0.037838 | −0.001137 | −0.000237 | −0.000112 | −0.000032 |
| H | −0.964227 | −0.184930 | −0.014422 | 0.000265 | 0.000043 | 0.000010 | 0.000003 |
| J | 0.561662 | 0.064789 | 0.003795 | −0.000043 | −0.000006 | −0.000001 | 0.000000 |
| L | −0.230325 | −0.015803 | −0.000691 | 0.000005 | 0.000001 | 0.000000 | 0.000000 |
| M | 0.065108 | 0.002591 | 0.000086 | 0.000000 | 0.000000 | 0.000000 | 0.000000 |
| N | −0.012078 | −0.000267 | −0.000007 | 0.000000 | 0.000000 | 0.000000 | 0.000000 |
| O | 0.001323 | 0.000015 | 0.000000 | 0.000000 | 0.000000 | 0.000000 | 0.000000 |
| P | −0.000065 | 0.000000 | 0.000000 | 0.000000 | 0.000000 | 0.000000 | 0.000000 |

Figure 6:
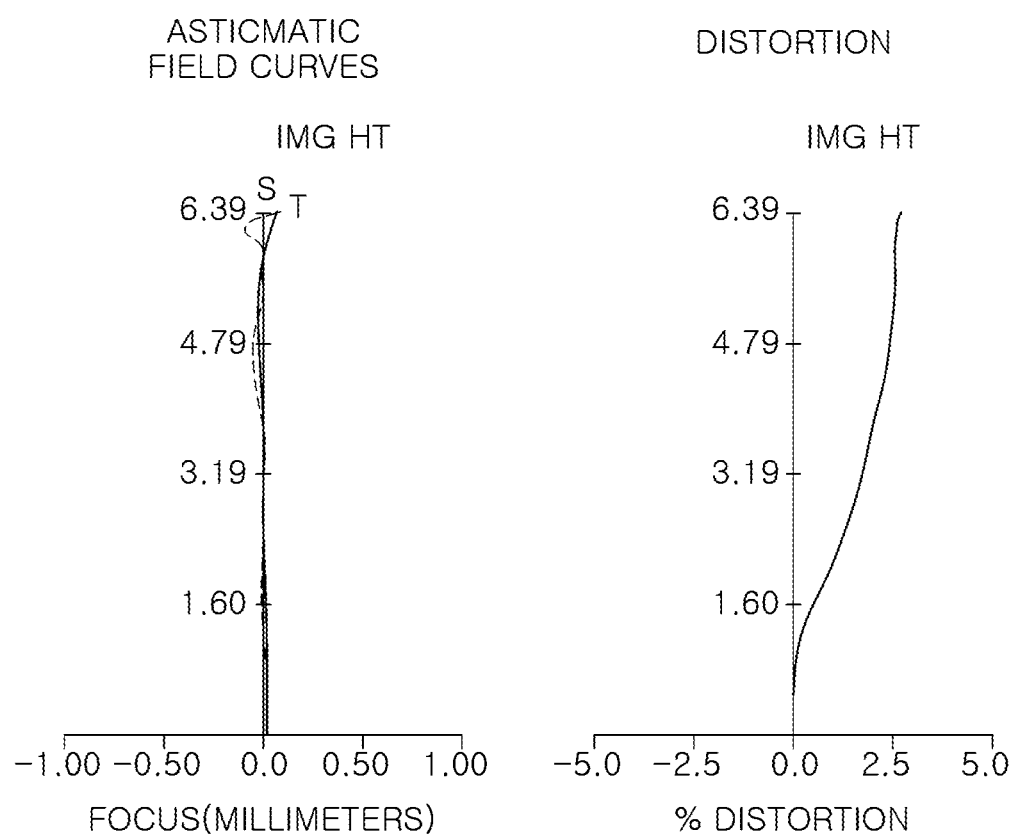
FIG. 6 is a graph illustrating an aberration curve of the optical imaging system illustrated in FIG. 5.

In addition, the optical imaging system according to the third example embodiment of the present disclosure configured as described above may have the aberration properties illustrated in FIG. 6.

Figure 7:
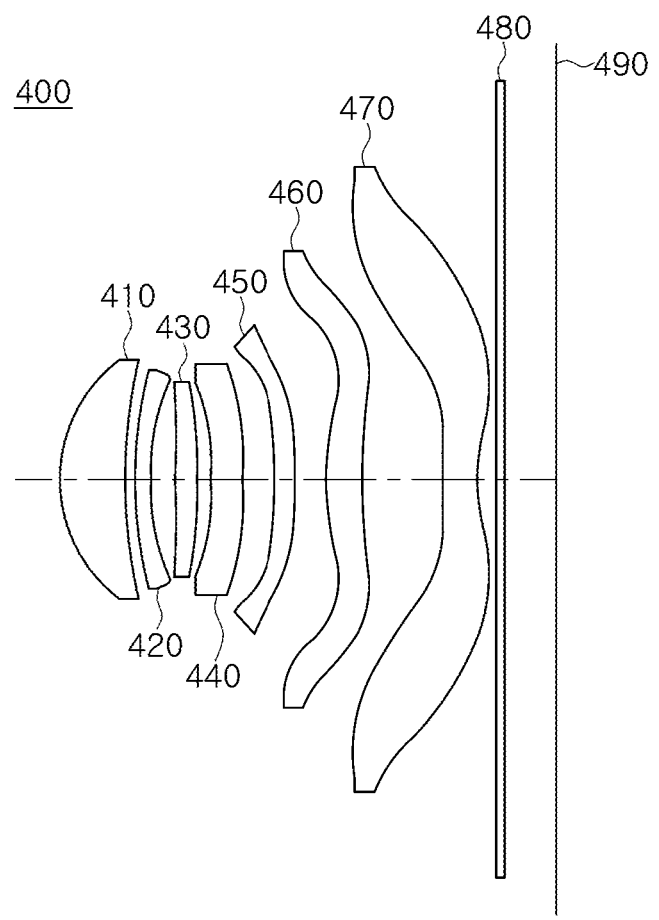
FIG. 7 is a configuration diagram illustrating an optical imaging system according to a fourth example embodiment of the present disclosure.

Next, an optical imaging system according to a fourth example embodiment of the present disclosure will be described with reference to FIGS. 7 and 8.

An optical imaging system 400 according to the fourth example embodiment of the present disclosure may include a first lens 410, a second lens 420, a third lens 430, a fourth lens 440, a fifth lens 450, a sixth lens 460, and a seventh lens 470.

According to the fourth example embodiment of the present disclosure, the first lens 410 may have positive refractive power, a first surface of the first lens 410 may be convex in a paraxial region thereof, and a second surface of the first lens 410 may be concave in a paraxial region thereof.

The second lens 420 may have negative refractive power, a first surface of the second lens 420 may be convex in a paraxial region thereof, and a second surface of the second lens 420 may be concave in a paraxial region thereof. The first lens 410 and the second lens 420 may be formed of a plastic material having different optical properties. For example, Abbe numbers of the first lens 410 and the second lens 420 may be different from each other.

The third lens 430 may have positive refractive power, and first and second surfaces of the third lens 430 may be convex in a paraxial region thereof. The second lens 420 and the third lens 430 may be formed of a plastic material having different optical properties. For example, Abbe numbers of the second lens 420 and the third lens 430 may be different from each other.

The fourth lens 440 may have negative refractive power, a first surface of the fourth lens 440 may be concave in a paraxial region thereof, and a second surface of the fourth lens 440 may be convex in a paraxial region thereof. The third lens 430 and the fourth lens 440 may be formed of a plastic material having different optical properties. For example, Abbe numbers of the third lens 430 and the fourth lens 440 may be different from each other.

The fifth lens 450 may have negative refractive power, and first and second surfaces of the fifth lens 450 may be concave in a paraxial region thereof. The fourth lens 440 and the fifth lens 450 may be formed of a plastic material having different optical properties. For example, Abbe numbers of the fourth lens 440 and the fifth lens 450 may be different from each other.

The sixth lens 460 may have positive refractive power, a first surface of the sixth lens 460 may be convex in a paraxial region thereof, and a second surface of the sixth lens 460 may be concave in a paraxial region thereof. In addition, at least one inflection point may be formed on the first surface and the second surface of the sixth lens 460. For example, The seventh lens 470 may have negative refractive power, a first surface of the seventh lens 470 may be convex in a paraxial region thereof, and a second surface of the seventh lens 470 may be concave in a paraxial region thereof. In addition, at least one inflection point may be formed on the first surface and the second surface of the seventh lens 470. For example, the first surface of the seventh lens 470 may be convex in the paraxial region thereof, and may be concave and convex toward an edge thereof, and the second surface of the seventh lens 470 may be concave in the paraxial region thereof, and may be convex toward an edge thereof. The sixth lens 460 and the seventh lens 470 may be formed of a plastic material having different optical properties. For example, Abbe numbers of the sixth lens 460 and the seventh lens 470 may be different from each other.

In addition, the optical imaging system 400 according to the fourth example embodiment of the present disclosure may further include an aperture (not illustrated), a filter 480, and an image sensor 490.

Table 7 shows properties (a radius of curvature, a thickness, a distance between lenses, a refractive index, an Abbe number, and a focal length) of the first to seventh lenses of the optical imaging system according to the fourth example embodiment of the present disclosure.

TABLE 7

| Surface | Note | Radius | Thickness | Index | Abbe number | Focal length |
|---|---|---|---|---|---|---|
| S1 | Lens 1 | 2.312 | 0.924 | 1.544 | 56.1 | 5.557 |
| S2 | | 8.329 | 0.138 | | | |
| S3 | Lens 2 | 11.478 | 0.231 | 1.680 | 18.4 | −17.043 |
| S4(stop) | | 5.758 | 0.340 | | | |
| S5 | Lens 3 | 25.054 | 0.314 | 1.544 | 56.1 | 35.452 |
| S6 | | −84.968 | 0.199 | | | |
| S7 | Lens 4 | −20.322 | 0.466 | 1.680 | 18.4 | −32.527 |
| S8 | | −219.610 | 0.455 | | | |
| S9 | Lens 5 | −824.828 | 0.300 | 1.614 | 25.9 | −48.772 |
| S10 | | 31.395 | 0.461 | | | |
| S11 | Lens 6 | 3.139 | 0.524 | 1.567 | 38.0 | 8.886 |
| S12 | | 7.738 | 1.170 | | | |
| S13 | Lens 7 | 7.024 | 0.496 | 1.535 | 56.1 | −5.823 |
| S14 | | 2.111 | 0.264 | | | |
| S15 | IR-cut | Infinity | 0.110 | 1.518 | 64.2 | |
| S16 | filter | Infinity | 0.714 | | | |
| S17 | image | Infinity | −0.018 | | | | the first surface of the sixth lens 460 may be convex in the paraxial region thereof, and may be concave toward an edge thereof, and a second surface of the sixth lens 460 may be concave in a paraxial region thereof, and may be convex toward an edge thereof. The fifth lens 450 and the sixth lens 460 may be formed of a plastic material having different optical properties. For example, Abbe numbers of the fifth lens 450 and the sixth lens 460 may be different from each other.

An overall focal length f of the optical imaging system according to the fourth embodiment of the present disclosure may be 6.313 mm, a field of view (FOV) of the optical imaging system may be 85.3°, OAL may be 7.09 mm, and IMH may be 6.12 mm.

Table 8 shows aspherical surface values of the optical imaging system according to the fourth example embodiment of the present disclosure. For example, both object-side surfaces and image-side surfaces of the first lens 410 to the seventh lens 470 may be aspherical surfaces.

TABLE 8

| Surface | S1 | S2 | S3 | S4 | S5 | S6 | S7 |
|---|---|---|---|---|---|---|---|
| K | −0.370600 | 10.175052 | 46.840061 | 1.929354 | 0.000000 | −99.00000 | 0.000000 |
| A | −0.008680 | −0.006681 | 0.003336 | −0.021075 | −0.011425 | −0.019405 | −0.041214 |
| B | 0.079698 | 0.027552 | −0.092911 | 0.244163 | −0.008889 | −0.066551 | 0.087053 |
| C | −0.284799 | −0.116133 | 0.549432 | −1.522098 | −0.137279 | 0.603293 | −0.760037 |
| D | 0.666647 | 0.318681 | −1.890181 | 6.074079 | 1.237088 | −3.194885 | 3.901285 |
| E | −1.064494 | −0.580110 | 4.300439 | −16.23257 | −4.987071 | 10.752850 | −12.86653 |
| F | 1.201379 | 0.737637 | −6.776670 | 30.286928 | 12.170503 | −24.35240 | 28.633832 |

TABLE 8-continued

|   | | | | | | | |
|---|---|---|---|---|---|---|---|
| G | −0.978541 | −0.676537 | 7.591034 | −40.46945 | −19.776755 | 38.413549 | 44.45506 |
| H | 0.580918 | 0.454576 | −6.126824 | 39.215712 | 22.308957 | −43.01408 | 49.062292 |
| J | −0.251224 | −0.224294 | 3.572007 | −27.59060 | −17.752030 | 34.405137 | −38.72129 |
| L | 0.078195 | 0.080425 | −1.490043 | 13.940896 | 9.942127 | −19.52182 | 21.696573 |
| M | −0.017038 | −0.020407 | 0.433524 | −4.924720 | −3.836124 | 7.674313 | −8.426911 |
| N | 0.002463 | 0.003476 | −0.083534 | 1.153414 | 0.970627 | −1.987485 | 2.156545 |
| O | −0.000212 | −0.000357 | 0.009578 | −0.160723 | −0.144904 | 0.305008 | −0.326970 |
| P | 0.000008 | 0.000017 | −0.000495 | 0.010073 | 0.009667 | −0.021013 | 0.022243 |

|   | S8 | S9 | S10 | S11 | S12 | S13 | S14 |
|---|---|---|---|---|---|---|---|
| K | 0.000000 | 0.000000 | −88.66161 | −14.96671 | −20.014000 | 1.120184 | −5.549016 |
| A | −0.039974 | −0.075715 | −0.110047 | 0.016571 | 0.009851 | −0.129642 | −0.080770 |
| B | 0.091670 | 0.060411 | 0.091533 | −0.027855 | −0.009351 | 0.045464 | 0.033914 |
| C | −0.370855 | −0.074664 | −0.125059 | 0.015625 | 0.000359 | −0.014277 | −0.011822 |
| D | 1.001283 | 0.127049 | 0.177675 | −0.007816 | 0.000575 | 0.003826 | 0.003034 |
| E | −1.855109 | −0.207160 | −0.193615 | 0.003293 | 0.000014 | −0.000768 | −0.000557 |
| F | 2.411745 | 0.252042 | 0.150610 | −0.001159 | −0.000160 | 0.000112 | 0.000073 |
| G | −2.240987 | −0.220597 | −0.083352 | 0.000342 | 0.000081 | −0.000012 | −0.000007 |
| H | 1.502694 | 0.139440 | 0.032957 | −0.000082 | −0.000023 | 0.000001 | 0.000000 |
| J | −0.727016 | −0.063829 | −0.009300 | 0.000015 | 0.000004 | 0.000000 | 0.000000 |
| L | 0.250807 | 0.020973 | 0.001853 | −0.000002 | 0.000000 | 0.000000 | 0.000000 |
| M | −0.060003 | −0.004818 | −0.000254 | 0.000000 | 0.000000 | 0.000000 | 0.000000 |
| N | 0.009427 | 0.000734 | 0.000023 | 0.000000 | 0.000000 | 0.000000 | 0.000000 |
| O | −0.000871 | −0.000066 | −0.000001 | 0.000000 | 0.000000 | 0.000000 | 0.000000 |
| P | 0.000036 | 0.000003 | 0.000000 | 0.000000 | 0.000000 | 0.000000 | 0.000000 |

Figure 8:
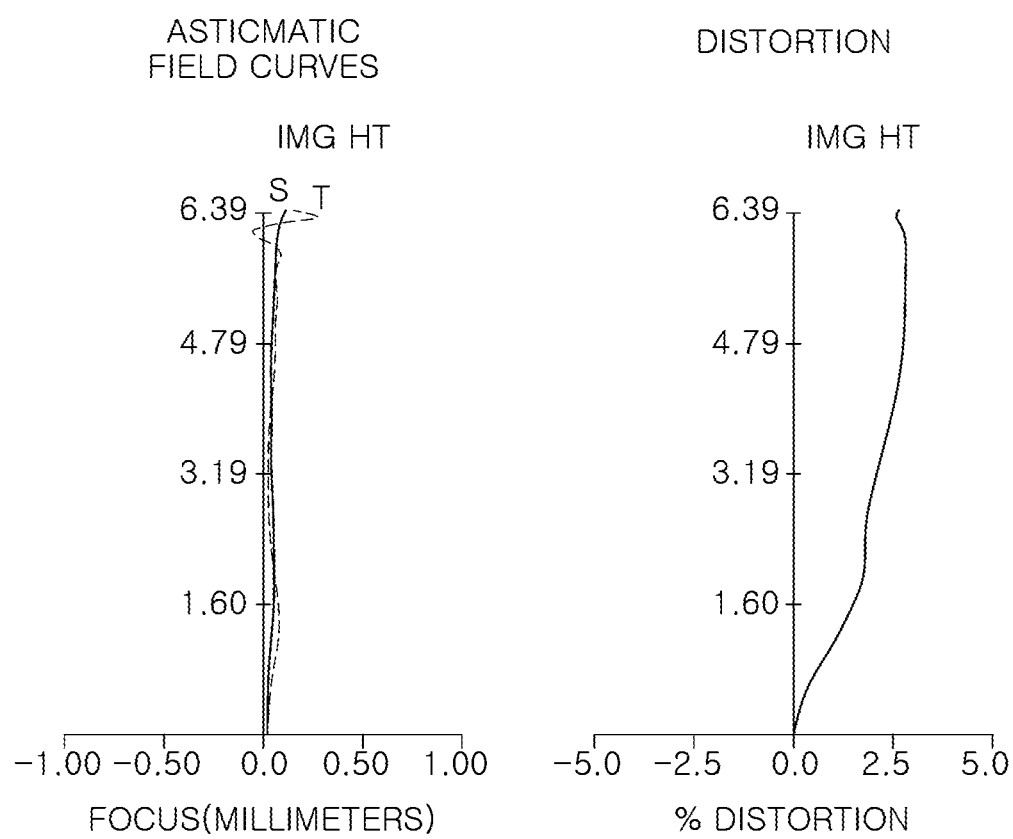
FIG. 8 is a graph illustrating an aberration curve of the optical imaging system illustrated in FIG. 7.

In addition, the optical imaging system according to the fourth example embodiment of the present disclosure configured as described above may have the aberration properties illustrated in FIG. 8.

Figure 9:
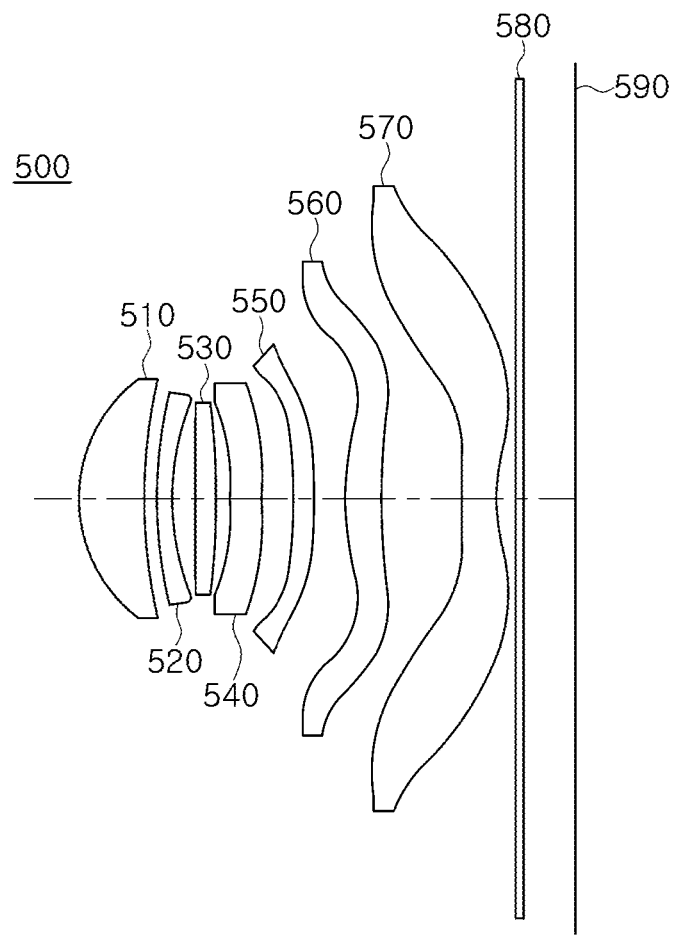
FIG. 9 is a configuration diagram illustrating an optical imaging system according to a fifth example embodiment of the present disclosure.

Next, an optical imaging system according to a fifth example embodiment of the present disclosure will be described with reference to FIGS. 9 and 10.

An optical imaging system 500 according to the fifth example embodiment of the present disclosure may include a first lens 510, a second lens 520, a third lens 530, a fourth lens 540, and a fifth lens 550, a sixth lens 560, and a seventh lens 570.

According to the fifth example embodiment of the present disclosure, the first lens 510 may have positive refractive power, a first surface of the first lens 510 may be convex in a paraxial region thereof, and a second surface of the first lens 510 may be concave in a paraxial region thereof.

The second lens 520 may have negative refractive power, a first surface of the second lens 520 may be convex in a paraxial region thereof, and a second surface of the second lens 520 may be concave in a paraxial region thereof. The first lens 510 and the second lens 520 may be formed of a plastic material having different optical properties. For example, Abbe numbers of the first lens 510 and the second lens 520 may be different from each other.

The third lens 530 may have positive refractive power, and first and second surfaces of the third lens 530 may be convex in a paraxial region thereof. The second lens 520 and the third lens 530 may be formed of a plastic material having different optical properties. For example, Abbe numbers of the second lens 520 and the third lens 530 may be different from each other.

The fourth lens 540 may have negative refractive power, a first surface of the fourth lens 540 may be concave in a paraxial region thereof, and a second surface of the fourth lens 540 may be convex in a paraxial region thereof. The third lens 530 and the fourth lens 540 may be formed of a plastic material having different optical properties. For example, Abbe numbers of the third lens 530 and the fourth lens 540 may be different from each other.

The fifth lens 550 may have negative refractive power, a first surface of the fifth lens 550 may be convex in a paraxial region thereof, and a second surface of the fifth lens 550 may be concave in a paraxial region thereof. The fourth lens 540 and the fifth lens 550 may be formed of a plastic material having different optical properties. For example, Abbe numbers of the fourth lens 540 and the fifth lens 550 may be different from each other.

The sixth lens 560 may have positive refractive power, a first surface of the sixth lens 560 may be convex in a paraxial region thereof, and a second surface of the sixth lens 560 may be concave in a paraxial region thereof. In addition, at least one inflection point may be formed on the first surface and the second surface of the sixth lens 560. For example, the first surface of the sixth lens 560 may be convex in the paraxial region thereof, and may be concave toward an edge thereof, and the second surface of the sixth lens 560 may be concave in the paraxial region thereof, and may be convex toward an edge thereof. The fifth lens 550 and the sixth lens 560 may be formed of a plastic material having different optical properties. For example, Abbe numbers of the fifth lens 550 and the sixth lens 560 may be different from each other.

The seventh lens 570 may have negative refractive power, a first surface of the seventh lens 570 may be convex in a paraxial region thereof, and a second surface of the seventh lens 570 may be concave in a paraxial region thereof. In addition, at least one inflection point may be formed on the first surface and the second surface of the seventh lens 570. For example, the first surface of the seventh lens 570 may be convex in the paraxial region thereof, and may be concave toward an edge thereof, and the second surface of the seventh lens 570 may be concave in the paraxial region thereof, and may be convex toward an edge thereof. The sixth lens 560 and the seventh lens 570 may be formed of a plastic material having different optical properties. For example, Abbe numbers of the sixth lens 560 and the seventh lens 570 may be different from each other.

In addition, the optical imaging system 500 according to the fifth example embodiment of the present disclosure may further include an aperture (not illustrated), a filter 580, and an image sensor 590.

Table 9 shows properties (a radius of curvature, a thickness, a distance between lenses, a refractive index, an Abbe number, and a focal length) of the first to seventh lenses of the optical imaging system according to the fifth example embodiment of the present disclosure.

TABLE 9

| Surface | Note | Radius | Thickness | Index | Abbe number | Focal length |
|---|---|---|---|---|---|---|
| S1 | Lens 1 | 2.309 | 0.943 | 1.544 | 56.1 | 5.555 |
| S2 |  | 8.262 | 0.135 |  |  |  |
| S3 | Lens 2 | 11.269 | 0.230 | 1.680 | 18.4 | −16.994 |
| S4(stop) |  | 5.695 | 0.330 |  |  |  |
| S5 | Lens 3 | 18.666 | 0.305 | 1.544 | 56.1 | 32.115 |
| S6 |  | −290.444 | 0.273 |  |  |  |
| S7 | Lens 4 | −13.775 | 0.408 | 1.680 | 18.4 | −30.446 |
| S8 |  | −40.591 | 0.418 |  |  |  |
| S9 | Lens 5 | 99.986 | 0.300 | 1.614 | 25.9 | −68.985 |
| S10 |  | 29.923 | 0.513 |  |  |  |
| S11 | Lens 6 | 3.667 | 0.565 | 1.567 | 38.0 | 8.989 |
| S12 |  | 12.131 | 1.058 |  |  |  |
| S13 | Lens 7 | 7.033 | 0.534 | 1.535 | 56.1 | −5.438 |
| S14 |  | 2.009 | 0.264 |  |  |  |
| S15 | IR-cut | Infinity | 0.110 | 1.518 | 64.2 |  |
| S16 | filter | Infinity | 0.710 |  |  |  |
| S17 | image | Infinity | −0.006 |  |  |  |

An overall focal length f of the optical imaging system according to the fifth example embodiment of the present disclosure may be 6.312 mm, a field of view (FOV) of the optical imaging system may be 85.3°, OAL may be 7.09 mm, and IMH may be 6.12 mm.

Table 10 shows aspherical surface values of the optical imaging system according to the fifth example embodiment of the present disclosure. For example, both object-side surfaces and image-side surfaces of the first lens 510 to the seventh lens 570 may be aspherical surfaces.

Figure 10:
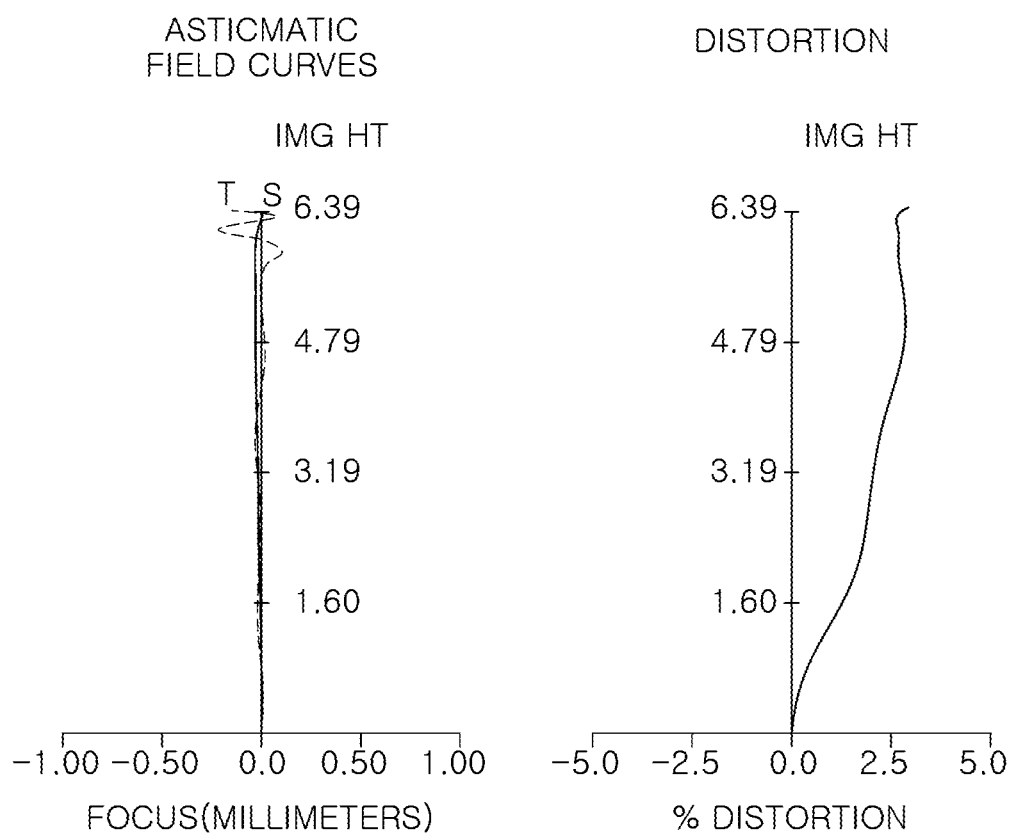
FIG. 10 is a graph illustrating an aberration curve of the optical imaging system illustrated in FIG. 9.

In addition, the optical imaging system according to the fifth example embodiment of the present disclosure configured as described above may have the aberration properties illustrated in FIG. 10.

Figure 11:
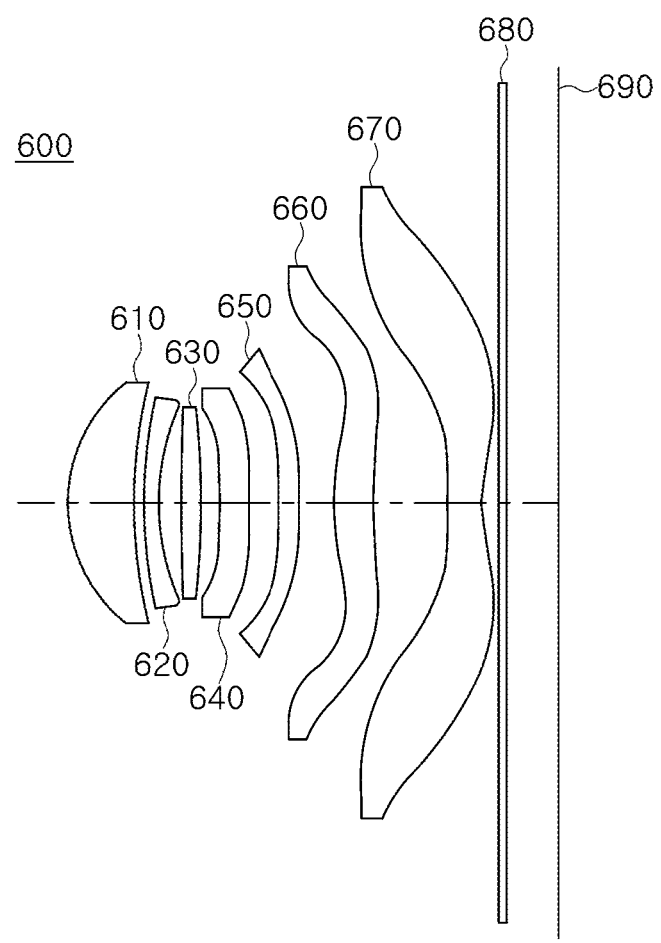
FIG. 11 is a configuration diagram illustrating an optical imaging system according to a sixth example embodiment of the present disclosure.

Next, an optical imaging system according to a sixth example embodiment of the present disclosure will be described with reference to FIGS. 11 and 12.

An optical imaging system 600 according to the sixth example embodiment of the present disclosure may include

TABLE 10

| Surface | S1 | S2 | S3 | S4 | S5 | S6 | S7 |
|---|---|---|---|---|---|---|---|
| K | 0.376001 | 10.303347 | 46.504741 | 3.784187 | 0.000000 | −99.00000 | 0.000000 |
| A | 0.004363 | −0.002563 | −0.004349 | 0.004898 | −0.002090 | −0.035799 | −0.037555 |
| B | −0.003284 | −0.000886 | 0.006160 | −0.026732 | −0.161867 | 0.164757 | −0.023236 |
| C | 0.023219 | 0.003444 | −0.009842 | 0.093836 | 0.995526 | −1.173932 | 0.188291 |
| D | −0.057964 | −0.010166 | 0.006698 | −0.017653 | −3.904991 | 5.357045 | −0.910000 |
| E | 0.086734 | 0.046107 | 0.092822 | −0.767927 | 10.509280 | −16.53766 | 2.939015 |
| F | −0.085611 | −0.116468 | −0.359681 | 2.809649 | −20.166839 | 35.697976 | −6.771744 |
| G | 0.058890 | 0.173627 | 0.666447 | −5.482863 | 28.184197 | −54.97480 | 11.259076 |
| H | −0.029172 | −0.167667 | −0.763045 | 6.911371 | −28.948247 | 61.022263 | −13.51255 |
| J | 0.010621 | 0.109820 | 0.582682 | −5.935821 | 21.825533 | −48.85454 | 11.652809 |
| L | −0.002870 | −0.049488 | −0.303701 | 3.511893 | −11.928551 | 27.916694 | −7.133274 |
| M | 0.000572 | 0.015163 | 0.107149 | −1.408853 | 4.595769 | −11.094104 | 3.020365 |
| N | −0.000081 | −0.003024 | −0.024545 | 0.365628 | −1.182924 | 2.910884 | −0.840464 |
| O | 0.000007 | 0.000355 | 0.003301 | −0.055269 | 0.182504 | −0.453068 | 0.138236 |
| P | 0.000000 | −0.000019 | −0.000198 | 0.003684 | −0.012762 | 0.031663 | −0.010183 |

|  | S8 | S9 | S10 | S11 | S12 | S13 | S14 |
|---|---|---|---|---|---|---|---|
| K | 0.000000 | 0.000000 | −48.01645 | −16.58769 | −15.674003 | 1.096943 | −8.263857 |
| A | −0.030430 | −0.073403 | −0.097321 | 0.004551 | 0.000278 | −0.148691 | −0.066389 |
| B | −0.028277 | 0.041000 | 0.053796 | 0.001289 | 0.012647 | 0.071654 | 0.029478 |
| C | 0.206437 | −0.021723 | −0.033884 | −0.019958 | −0.021117 | −0.029231 | −0.010621 |
| D | 0.719762 | 0.007592 | 0.015777 | 0.020577 | 0.013937 | 0.008913 | 0.002773 |
| E | 1.555829 | −0.008500 | 0.001327 | −0.012477 | −0.005813 | −0.001934 | −0.000527 |
| F | −2.282840 | 0.019136 | −0.009268 | 0.005113 | 0.001685 | 0.000303 | 0.000075 |
| G | 2.363952 | −0.025223 | 0.007926 | −0.001467 | −0.000348 | −0.000035 | −0.000008 |
| H | 1.759879 | 0.020211 | −0.003864 | 0.000297 | 0.000051 | 0.000003 | 0.000001 |
| J | 0.946253 | −0.010704 | 0.001235 | −0.000042 | −0.000005 | 0.000000 | 0.000000 |
| L | −0.364338 | 0.003896 | −0.000266 | 0.000004 | 0.000000 | 0.000000 | 0.000000 |
| M | 0.097980 | −0.000977 | 0.000038 | 0.000000 | 0.000000 | 0.000000 | 0.000000 |
| N | −0.017483 | 0.000163 | −0.000003 | 0.000000 | 0.000000 | 0.000000 | 0.000000 |
| O | 0.001861 | −0.000016 | 0.000000 | 0.000000 | 0.000000 | 0.000000 | 0.000000 |
| P | −0.000089 | 0.000001 | 0.000000 | 0.000000 | 0.000000 | 0.000000 | 0.000000 | a first lens 610, a second lens 620, a third lens 630, a fourth lens 640, a fifth lens 650, a sixth lens 660, and a seventh lens 670.

According to the sixth example embodiment of the present disclosure, the first lens 610 may have positive refractive power, a first surface of the first lens 610 may be convex in a paraxial region thereof, and a second surface of the first lens 610 may be concave in a paraxial region thereof.

The second lens 620 may have negative refractive power, a first surface of the second lens 620 may be convex in a paraxial region thereof, and a second surface of the second lens 620 may be concave in a paraxial region thereof. The first lens 610 and the second lens 620 may be formed of a plastic material having different optical properties. For example, Abbe numbers of the first lens 610 and the second lens 620 may be different from each other.

The third lens 630 may have positive refractive power, a first surface of the third lens 630 may be convex in a paraxial region thereof, and a second surface of the third lens 630 may be concave in a paraxial region thereof. The second lens 620 and the third lens 630 may be formed of a plastic material having different optical properties. For example, Abbe numbers of the second lens 620 and the third lens 630 may be different from each other.

The fourth lens 640 may have negative refractive power, a first surface of the fourth lens 640 may be concave in a paraxial region thereof, and a second surface of the fourth lens 640 may be convex in a paraxial region thereof. The third lens 630 and the fourth lens 640 may be formed of a plastic material having different optical properties. For example, Abbe numbers of the third lens 630 and the fourth lens 640 may be different from each other.

The fifth lens 650 may have negative refractive power, a first surface of the fifth lens 650 may be convex in a paraxial region thereof, and a second surface of the fifth lens 650 may be concave in a paraxial region thereof. The fourth lens 640 and the fifth lens 650 may be formed of a plastic material having different optical properties. For example, Abbe numbers of the fourth lens 640 and the fifth lens 650 may be different from each other.

The sixth lens 660 may have positive refractive power, a first surface of the sixth lens 660 may be convex in a paraxial region thereof, and a second surface of the sixth lens 660 may be concave in a paraxial region thereof. In addition, at least one inflection point may be formed on the first surface and the second surface of the sixth lens 660. For example, the first surface of the sixth lens 660 may be convex in the paraxial region thereof, and may be concave toward an edge thereof, and the second surface of the sixth lens 660 may be concave in the paraxial region thereof, and may be convex toward an edge thereof. The fifth lens 650 and the sixth lens 660 may be formed of a plastic material having different optical properties. For example, Abbe numbers of the fifth lens 650 and the sixth lens 660 may be different from each other.

The seventh lens 670 may have negative refractive power, a first surface of the seventh lens 670 may be convex in a paraxial region thereof, and a second surface of the seventh lens 670 may be concave in a paraxial region thereof. In addition, at least one inflection point may be formed on the first surface and the second surface of the seventh lens 670. For example, the first surface of the seventh lens 670 may be convex in the paraxial region thereof, and may be concave toward an edge thereof, and the second surface of the seventh lens 670 may be concave in the paraxial region thereof, and may be convex toward an edge thereof. The sixth lens 660 and the seventh lens 670 may be formed of a plastic material having different optical properties. For example, Abbe numbers of the sixth lens 660 and the seventh lens 670 may be different from each other.

In addition, the optical imaging system 600 according to the sixth example embodiment of the present disclosure may further include an aperture (not illustrated), a filter 680, and an image sensor 690.

Table 11 shows properties (a radius of curvature, a thickness, a distance between lenses, a refractive index, an Abbe number, and a focal length) of the first to seventh lenses of the optical imaging system according to the sixth example embodiment of the present disclosure.

TABLE 11

| Surface | Note | Radius | Thickness | Index | Abbe number | Focal length |
|---|---|---|---|---|---|---|
| S1 | Lens 1 | 2.310 | 0.955 | 1.544 | 56.1 | 5.550 |
| S2 | | 8.279 | 0.134 | | | |
| S3 | Lens 2 | 11.300 | 0.230 | 1.680 | 18.4 | −16.689 |
| S4(stop) | | 5.653 | 0.326 | | | |
| S5 | Lens 3 | 17.428 | 0.296 | 1.544 | 56.1 | 33.824 |
| S6 | | 304.535 | 0.264 | | | |
| S7 | Lens 4 | −14.545 | 0.429 | 1.680 | 18.4 | −30.901 |
| S8 | | −46.441 | 0.429 | | | |
| S9 | Lens 5 | 169.531 | 0.300 | 1.614 | 25.9 | −84.896 |
| S10 | | 40.139 | 0.516 | | | |
| S11 | Lens 6 | 3.679 | 0.570 | 1.567 | 38.0 | 8.930 |
| S12 | | 12.478 | 1.059 | | | |
| S13 | Lens 7 | 7.029 | 0.505 | 1.535 | 56.1 | −5.464 |
| S14 | | 2.018 | 0.264 | | | |
| S15 | IR-cut | Infinity | 0.110 | 1.518 | 64.2 | |
| S16 | filter | Infinity | 0.722 | | | |
| S17 | image | Infinity | −0.020 | | | |

An overall focal length f of the optical imaging system according to the sixth example embodiment of the present disclosure may be 6.313 mm, a field of view (FOV) of the optical imaging system may be 85.3°, OAL may be 7.09 mm, and IMH may be 6.12 mm.

Table 12 shows aspherical surface values of the optical imaging system according to the sixth example embodiment of the present disclosure. For example, both object-side surfaces and image-side surfaces of the first lens 610 to the seventh lens 670 may be aspherical surfaces.

TABLE 12

| Surface | S1 | S2 | S3 | S4 | S5 | S6 | S7 |
|---|---|---|---|---|---|---|---|
| K | −0.365348 | 9.898636 | 46.563996 | 3.918387 | 0.000000 | 99.000000 | 0.000000 |
| A | 0.004418 | −0.004118 | −0.005583 | −0.002318 | −0.009323 | −0.023903 | −0.031550 |
| B | −0.000253 | 0.006477 | 0.003613 | 0.036576 | −0.087089 | 0.029153 | −0.113652 |
| C | 0.006651 | −0.027098 | 0.018223 | −0.246799 | 0.606598 | −0.230431 | 0.892345 |
| D | −0.018465 | 0.094906 | −0.073809 | 1.194829 | −2.636102 | 1.086301 | −4.182452 |
| E | 0.034847 | −0.221256 | 0.183121 | −3.729425 | 7.730494 | −3.350520 | 12.794939 |
| F | −0.046743 | 0.360230 | −0.314996 | 7.898921 | −15.936572 | 7.071232 | −27.06737 |
| G | 0.045508 | −0.420733 | 0.382450 | −11.72547 | 23.632479 | −10.48984 | 40.792801 |
| H | −0.032239 | 0.355425 | −0.331847 | 12.402915 | −25.478735 | 11.097456 | −44.42500 |
| J | 0.016533 | −0.216619 | 0.207232 | −9.381042 | 19.976395 | −8.396580 | 35.038244 |
| L | −0.006055 | 0.094042 | −0.092800 | 5.025250 | −11.263798 | 4.500061 | −19.81445 |
| M | 0.001542 | −0.028302 | 0.029213 | −1.857210 | 4.447477 | −1.664233 | 7.828281 |
| N | −0.000259 | 0.005603 | −0.006167 | 0.449069 | −1.166814 | 0.402750 | −2.050902 |
| O | 0.000026 | −0.000655 | 0.000787 | −0.063703 | 0.182682 | −0.057179 | 0.320053 |
| P | −0.000001 | 0.000034 | −0.000046 | 0.004000 | −0.012918 | 0.003592 | −0.022515 |
| | S8 | S9 | S10 | S11 | S12 | S13 | S14 |
| K | 0.000000 | 0.000000 | −99.000000 | −16.76930 | −15.143543 | 1.099369 | −8.184460 |
| A | −0.034083 | −0.072300 | −0.102667 | 0.004445 | 0.000091 | −0.149332 | −0.065353 |
| B | 0.014883 | 0.037424 | 0.087064 | 0.001279 | 0.012894 | 0.071055 | 0.026482 |
| C | −0.034146 | 0.007697 | −0.130316 | −0.019355 | −0.021261 | −0.028184 | −0.008100 |
| D | 0.072486 | −0.102200 | 0.187940 | 0.019807 | 0.014037 | 0.008278 | 0.001623 |
| E | −0.133728 | 0.221608 | −0.204325 | −0.011928 | −0.005873 | −0.001716 | −0.000192 |
| F | 0.179785 | −0.289532 | 0.161237 | 0.004854 | 0.001710 | 0.000255 | 0.000008 |
| G | −0.167863 | 0.255307 | −0.092474 | −0.001383 | −0.000355 | −0.000028 | 0.000001 |
| H | 0.106931 | −0.157231 | 0.038641 | 0.000278 | 0.000053 | 0.000002 | 0.000000 |
| J | −0.045003 | 0.068193 | −0.011720 | −0.000039 | −0.000005 | 0.000000 | 0.000000 |
| L | 0.011408 | −0.020647 | 0.002547 | 0.000004 | 0.000000 | 0.000000 | 0.000000 |
| M | −0.001172 | 0.004248 | −0.000386 | 0.000000 | 0.000000 | 0.000000 | 0.000000 |
| N | −0.000185 | −0.000562 | 0.000039 | 0.000000 | 0.000000 | 0.000000 | 0.000000 |
| O | 0.000068 | 0.000043 | −0.000002 | 0.000000 | 0.000000 | 0.000000 | 0.000000 |
| P | −0.000006 | −0.000001 | 0.000000 | 0.000000 | 0.000000 | 0.000000 | 0.000000 |

Figure 12:
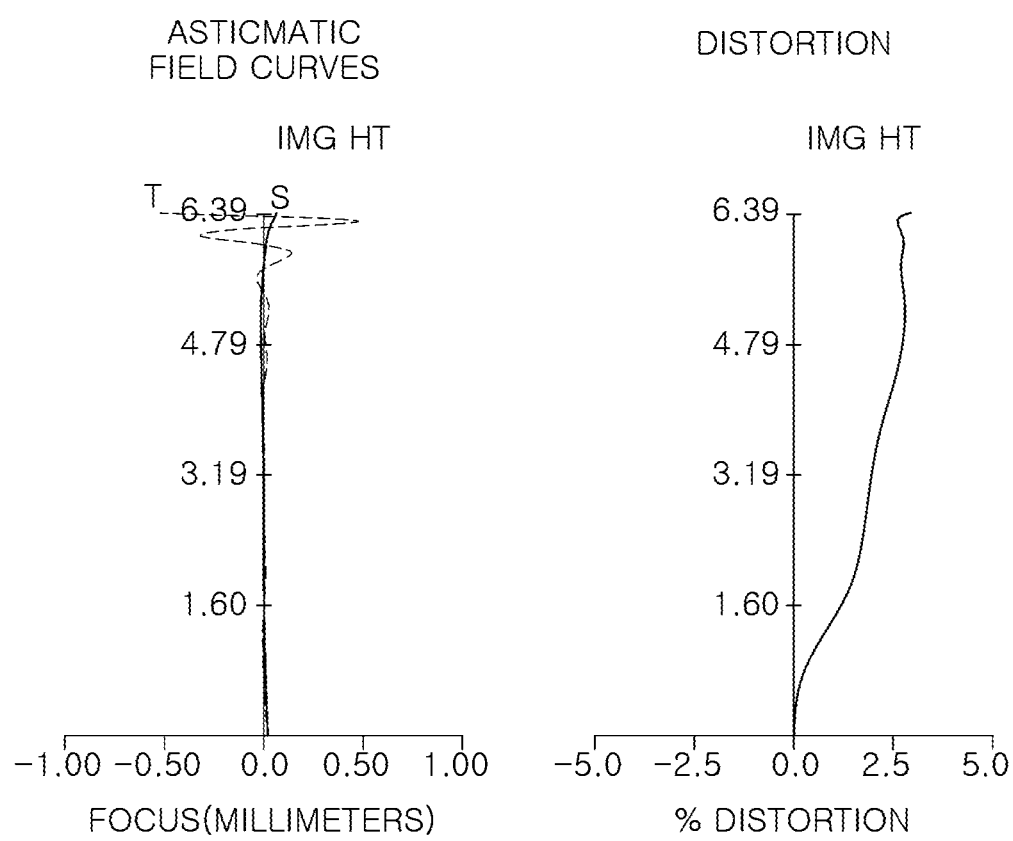
FIG. 12 is a graph illustrating an aberration curve of the optical imaging system illustrated in FIG. 11.

In addition, the optical imaging system according to the sixth example embodiment of the present disclosure configured as described above may have the aberration properties illustrated in FIG. 12.

Figure 13:
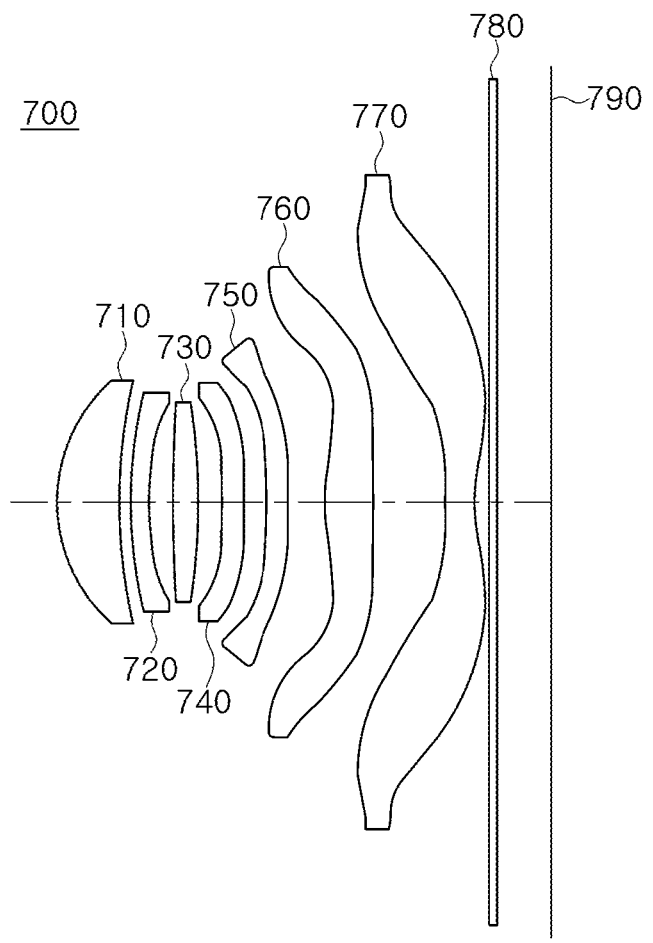
FIG. 13 is a configuration diagram illustrating an optical imaging system according to a seventh example embodiment of the present disclosure.

Next, an optical imaging system according to a seventh example embodiment of the present disclosure will be described with reference to FIGS. 13 and 14.

An optical imaging system 700 according to the seventh example embodiment of the present disclosure may include a first lens 710, a second lens 720, a third lens 730, a fourth lens 740, a fifth lens 750, a sixth lens 760, and a seventh lens 770.

According to the seventh example embodiment of the present disclosure, the first lens 710 may have positive refractive power, a first surface of the first lens 710 may be convex in a paraxial region thereof, and a second surface of the first lens 710 may be concave in a paraxial region thereof.

The second lens 720 may have negative refractive power, a first surface of the second lens 720 may be convex in a paraxial region thereof, and a second surface of the second lens 720 may be concave in a paraxial region thereof. The first lens 710 and the second lens 720 may be formed of a plastic material having different optical properties. For example, Abbe numbers of the first lens 710 and the second lens 720 may be different from each other.

The third lens 730 may have positive refractive power, a first surface of the third lens 730 may be convex in a paraxial region thereof, and a second surface of the third lens 730 may be concave in a paraxial region thereof. The second lens 720 and the third lens 730 may be formed of a plastic material having different optical properties. For example, Abbe numbers of the second lens 720 and the third lens 730 may be different from each other.

The fourth lens 740 may have negative refractive power, and first and second surfaces of the fourth lens 740 may be concave in a paraxial region thereof. The third lens 730 and the fourth lens 740 may be formed of a plastic material having different optical properties. For example, Abbe numbers of the third lens 730 and the fourth lens 740 may be different from each other.

The fifth lens 750 may have negative refractive power, a first surface of the fifth lens 750 may be convex in a paraxial region thereof, and a second surface of the fifth lens 750 may be concave in a paraxial region thereof. The fourth lens 740 and the fifth lens 750 may be formed of a plastic material having different optical properties. For example, Abbe numbers of the fourth lens 740 and the fifth lens 750 may be different from each other.

The sixth lens 760 may have positive refractive power, a first surface of the sixth lens 760 may be convex in a paraxial region thereof, and a second surface of the sixth lens 760 may be concave in a paraxial region thereof. In addition, at least one inflection point may be formed on the first surface and the second surface of the sixth lens 760. For example, the first surface of the sixth lens 760 may be convex in the paraxial region thereof, and may be concave toward an edge thereof, and the second surface of the sixth lens 760 may be concave in the paraxial region thereof, and may be convex toward an edge thereof. The fifth lens 750 and the sixth lens 760 may be formed of a plastic material having different optical properties. For example, Abbe numbers of the fifth lens 750 and the sixth lens 760 may be different from each other.

The seventh lens 770 may have negative refractive power, a first surface of the seventh lens 770 may be convex in a paraxial region thereof, and a second surface of the seventh lens 770 may be concave in a paraxial region thereof. In addition, at least one inflection point may be formed on the first surface and the second surface of the seventh lens 770. For example, the first surface of the seventh lens 770 may be convex in the paraxial region thereof, and may be concave toward an edge thereof, and the second surface of the seventh lens 770 may be concave in the paraxial region thereof, and may be convex toward an edge thereof. The sixth lens 760 and the seventh lens 770 may be formed of a plastic material having different optical properties. For example, Abbe numbers of the sixth lens 760 and the seventh lens 770 may be different from each other.

In addition, the optical imaging system 700 according to the seventh example embodiment of the present disclosure may further include an aperture (not illustrated), a filter 780, and an image sensor 790.

Table 13 shows properties (a radius of curvature, a thickness, a distance between lenses, a refractive index, an Abbe number, and a focal length) of the first to seventh lenses of the optical imaging system according to the seventh example embodiment of the present disclosure.

TABLE 13

| Surface | Note | Radius | Thickness | Index | Abbe number | Focal length |
|---|---|---|---|---|---|---|
| S1 | Lens 1 | 2.356 | 0.902 | 1.544 | 56.1 | 5.898 |
| S2 | | 7.573 | 0.151 | | | |
| S3 | Lens 2 | 9.373 | 0.281 | 1.680 | 18.4 | −17.235 |
| S4 | | 5.175 | 0.339 | | | |
| S5(stop) | Lens 3 | 11.035 | 0.348 | 1.544 | 56.1 | 24.718 |
| S6 | | 64.641 | 0.341 | | | |
| S7 | Lens 4 | −30.698 | 0.314 | 1.680 | 18.4 | −29.938 |
| S8 | | 63.186 | 0.329 | | | |
| S9 | Lens 5 | 31.536 | 0.331 | 1.614 | 25.9 | −58.810 |
| S10 | | 16.843 | 0.542 | | | |
| S11 | Lens 6 | 4.363 | 0.672 | 1.567 | 38.0 | 7.763 |
| S12 | | 269.113 | 1.048 | | | |
| S13 | Lens 7 | 7.901 | 0.420 | 1.535 | 56.1 | −4.895 |
| S14 | | 1.936 | 0.206 | | | |
| S15 | IR-cut | Infinity | 0.110 | 1.518 | 64.2 | |
| S16 | filter | Infinity | 0.774 | | | |
| S17 | image | Infinity | −0.020 | | | |

An overall focal length f of the optical imaging system according to the seventh example embodiment of the present disclosure may be 6.328 mm, a field of view (FOV) of the optical imaging system may be 85.3°, OAL may be 7.09 mm, and IMH may be 6.12 mm.

Table 14 shows aspherical surface values of the optical imaging system according to the seventh example embodiment of the present disclosure. For example, both object-side surfaces and image-side surfaces of the first lens 710 to the seventh lens 770 may be aspherical surfaces.

TABLE 14

| Surface | S1 | S2 | S3 | S4 | S5 | S6 | S7 |
|---|---|---|---|---|---|---|---|
| K | −0.527448 | −0.361543 | 17.713365 | 5.777454 | −3.326171 | −96.867181 | −1.449414 |
| A | −0.001443 | −0.005095 | −0.009169 | −0.014801 | −0.019440 | −0.014440 | −0.027545 |
| B | 0.029693 | −0.001685 | −0.034412 | 0.026940 | −0.029561 | −0.007590 | −0.100417 |
| C | −0.074650 | 0.027959 | 0.208341 | −0.022373 | 0.384655 | −0.339806 | 0.377556 |
| D | 0.135740 | −0.101667 | −0.610798 | −0.149969 | −2.077231 | 2.466632 | −0.607269 |
| E | −0.186223 | 0.234480 | 1.201924 | 0.816638 | 6.663288 | −8.910946 | −0.478342 |
| F | 0.197896 | −0.365822 | −1.678229 | −2.008583 | −14.224343 | 20.115290 | 4.042131 |
| G | −0.162211 | 0.398606 | 1.705730 | 3.020408 | 21.256984 | −30.712966 | −8.604481 |
| H | 0.101002 | −0.309081 | −1.275920 | −3.004664 | −22.760198 | 32.853583 | 10.590282 |
| J | −0.046905 | 0.171613 | 0.702043 | 2.025627 | 17.570622 | 24.934978 | −8.539676 |
| L | 0.015883 | −0.067744 | −0.280564 | −0.920011 | −9.699041 | 13.371025 | 4.665216 |
| M | −0.003794 | 0.018560 | 0.079146 | 0.271609 | 3.732165 | −4.953078 | −1.717149 |
| N | 0.000605 | −0.003354 | −0.014923 | −0.047917 | −0.950250 | 1.205740 | 0.408744 |
| O | −0.000058 | 0.000359 | 0.001686 | 0.004126 | 0.143771 | −0.173522 | −0.056899 |
| P | 0.000002 | −0.000017 | −0.000086 | −0.000080 | −0.009780 | 0.011184 | 0.003520 |

| | S8 | S9 | S10 | S11 | S12 | S13 | S14 |
|---|---|---|---|---|---|---|---|
| K | −95.40875 | −52.652750 | 12.020981 | −17.40017 | −57.936364 | −7.625581 | −9.050470 |
| A | −0.066355 | −0.105916 | −0.124825 | −0.017843 | −0.009494 | −0.202179 | −0.098464 |
| B | 0.168630 | 0.107908 | 0.089668 | 0.006966 | 0.019014 | 0.129475 | 0.058911 |
| C | −0.517024 | −0.051265 | −0.041509 | −0.009691 | −0.021225 | −0.061310 | −0.024875 |
| D | 1.026063 | −0.161700 | −0.033237 | 0.006298 | 0.012458 | 0.020438 | 0.007263 |
| E | −1.347623 | 0.479028 | 0.089416 | −0.003395 | −0.005016 | −0.004737 | −0.001501 |
| F | 1.133767 | −0.674695 | −0.089853 | 0.001629 | 0.001509 | 0.000778 | 0.000225 |

TABLE 14-continued

| | | | | | | | |
|---|---|---|---|---|---|---|---|
| G | −0.530066 | 0.603839 | 0.054727 | −0.000616 | −0.000347 | −0.000092 | −0.000025 |
| H | 0.019985 | −0.370151 | −0.022264 | 0.000165 | 0.000061 | 0.000008 | 0.000002 |
| J | 0.151818 | 0.159442 | 0.006252 | −0.000030 | −0.000008 | −0.000001 | 0.000000 |
| L | −0.109839 | −0.048301 | −0.001218 | 0.000004 | 0.000001 | 0.000000 | 0.000000 |
| M | 0.040958 | 0.010081 | 0.000162 | 0.000000 | 0.000000 | 0.000000 | 0.000000 |
| N | −0.008989 | −0.001380 | −0.000014 | 0.000000 | 0.000000 | 0.000000 | 0.000000 |
| O | 0.001103 | 0.000111 | 0.000001 | 0.000000 | 0.000000 | 0.000000 | 0.000000 |
| P | −0.000059 | −0.000004 | 0.000000 | 0.000000 | 0.000000 | 0.000000 | 0.000000 |

Figure 14:
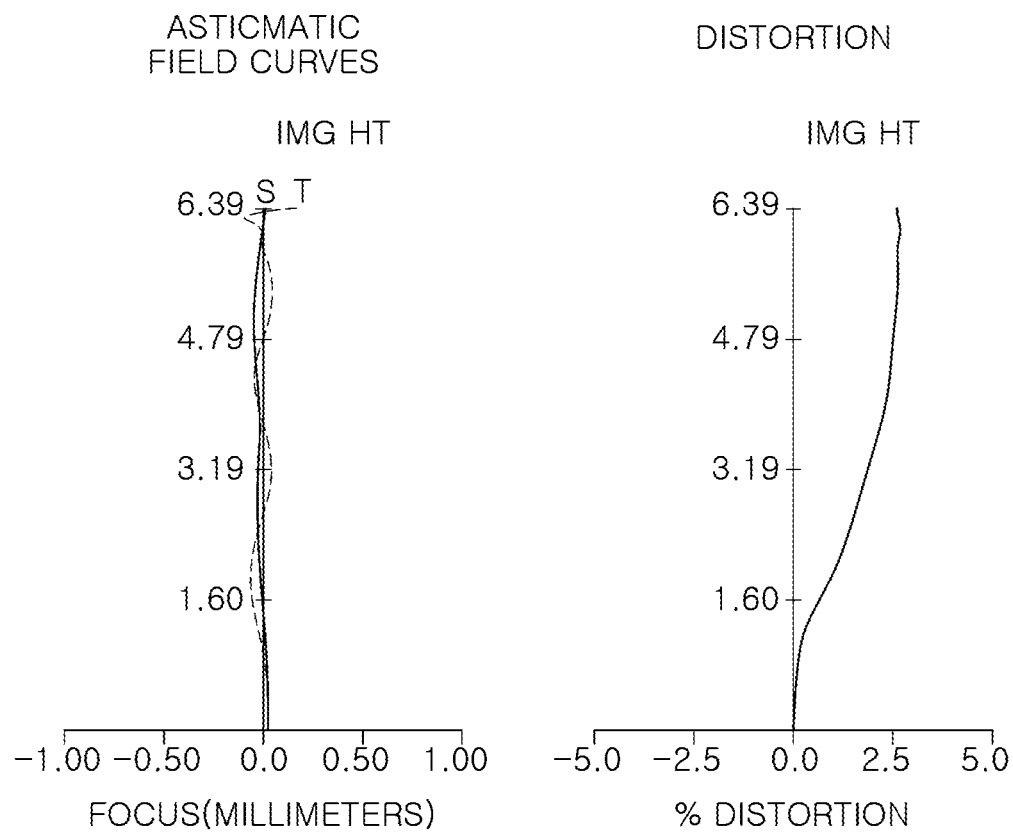
FIG. 14 is a graph illustrating an aberration curve of the optical imaging system illustrated in FIG. 13.

In addition, the optical imaging system according to the seventh example embodiment of the present disclosure configured as described above may have the aberration properties illustrated in FIG. 14.

Figure 15:
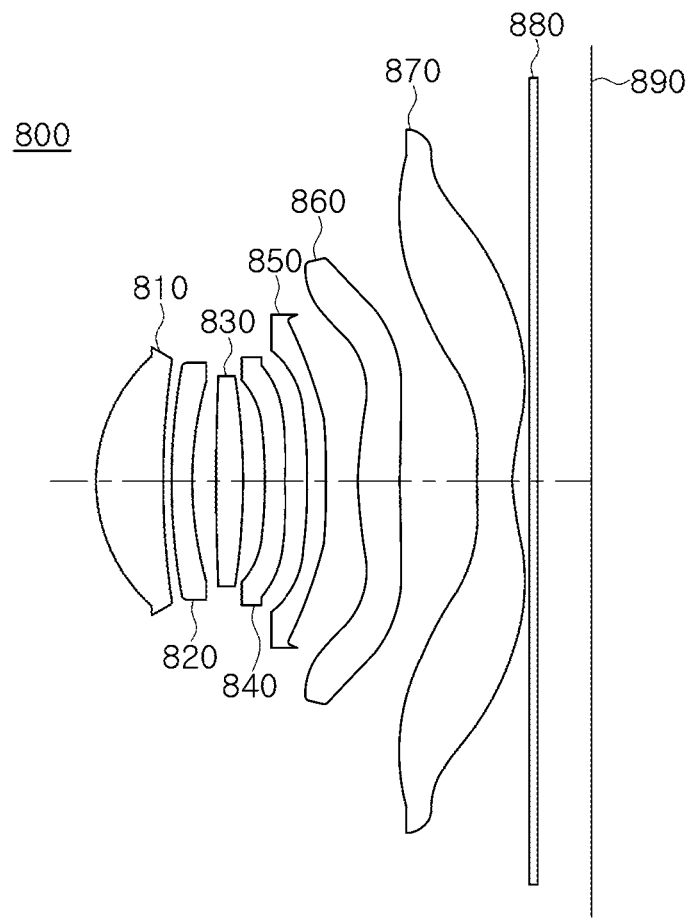
FIG. 15 is a configuration diagram illustrating an optical imaging system according to an eighth example embodiment of the present disclosure.

Finally, an optical imaging system according to an eighth example embodiment of the present disclosure will be described with reference to FIGS. 15 and 16.

An optical imaging system 800 according to the eighth example embodiment of the present disclosure may include a first lens 810, a second lens 820, a third lens 830, a fourth lens 840, a fifth lens 850, a sixth lens 860, and a seventh lens 870.

According to the eighth example embodiment of the present disclosure, the first lens 810 may have positive refractive power, a first surface of the first lens 810 may be convex in a paraxial region thereof, and a second surface of the first lens 810 may be concave in a paraxial region thereof.

The second lens 820 may have negative refractive power, a first surface of the second lens 820 may be convex in a paraxial region thereof, and a second surface of the second lens 820 may be concave in a paraxial region thereof. The first lens 810 and the second lens 820 may be formed of a plastic material having different optical properties. For example, Abbe numbers of the first lens 810 and the second lens 820 may be different from each other.

The third lens 830 may have positive refractive power, and first and second surfaces of the third lens 830 may be convex in a paraxial region thereof. The second lens 820 and the third lens 830 may be formed of a plastic material having different optical properties. For example, Abbe numbers of the second lens 820 and the third lens 830 may be different from each other.

The fourth lens 840 may have negative refractive power, a first surface of the fourth lens 840 may be concave in a paraxial region thereof, and a second surface of the fourth lens 840 may be convex in a paraxial region thereof. The third lens 830 and the fourth lens 840 may be formed of a plastic material having different optical properties. For example, Abbe numbers of the third lens 830 and the fourth lens 840 may be different from each other.

The fifth lens 850 may have negative refractive power, a first surface of the fifth lens 850 may be convex in a paraxial region thereof, and a second surface of the fifth lens 850 may be concave in a paraxial region thereof. The fourth lens 840 and the fifth lens 850 may be formed of a plastic material having different optical properties. For example, Abbe numbers of the fourth lens 840 and the fifth lens 850 may be different from each other.

The sixth lens 860 may have positive refractive power, a first surface of the sixth lens 860 may be convex in a paraxial region thereof, and a second surface of the sixth lens 860 may be concave in a paraxial region thereof. In addition, at least one inflection point may be formed on the first surface and the second surface of the sixth lens 860. For example, the first surface of the sixth lens 860 may be convex in the paraxial region thereof, and may be concave toward an edge thereof, and the second surface of the sixth lens 860 may be concave in the paraxial region thereof, and may be convex toward an edge thereof. The fifth lens 850 and the sixth lens 860 may be formed of a plastic material having different optical properties. For example, Abbe numbers of the fifth lens 850 and the sixth lens 860 may be different from each other.

The seventh lens 870 may have negative refractive power, a first surface of the seventh lens 870 may be convex in a paraxial region thereof, and a second surface of the seventh lens 870 may be concave in a paraxial region thereof. In addition, at least one inflection point may be formed on the first surface and the second surface of the seventh lens 870. For example, the first surface of the seventh lens 870 may be convex in the paraxial region thereof, and may be concave toward an edge thereof, and the second surface of the seventh lens 870 may be concave in the paraxial region thereof, and may be convex toward an edge thereof. The sixth lens 860 and the seventh lens 870 may be formed of a plastic material having different optical properties. For example, Abbe numbers of the sixth lens 860 and the seventh lens 870 may be different from each other.

In addition, the optical imaging system 800 according to the eighth example embodiment of the present disclosure may further include an aperture (not illustrated), a filter 880, and an image sensor 890.

Table 15 shows properties (a radius of curvature, a thickness, a distance between lenses, a refractive index, an Abbe number, and a focal length) of the first to seventh lenses of the optical imaging system according to the eighth example embodiment of the present disclosure.

TABLE 15

| Surface | Note | Radius | Thickness | Index | Abbe number | Focal length |
|---|---|---|---|---|---|---|
| S1 | Lens 1 | 2.421 | 0.972 | 1.544 | 56.1 | 5.631 |
| S2 | | 9.745 | 0.118 | | | |
| S3 | Lens 2 | 16.486 | 0.282 | 1.680 | 18.4 | −15.932 |
| S4(stop) | | 6.486 | 0.355 | | | |
| S5 | Lens 3 | 13.078 | 0.373 | 1.544 | 56.1 | 23.711 |
| S6 | | −1341.637 | 0.317 | | | |
| S7 | Lens 4 | −15.209 | 0.300 | 1.680 | 18.4 | −24.667 |

TABLE 15-continued

| Surface | Note | Radius | Thickness | Index | Abbe number | Focal length |
|---|---|---|---|---|---|---|
| S8 | | −166.994 | 0.309 | | | |
| S9 | Lens 5 | 33.872 | 0.285 | 1.614 | 25.9 | −51.565 |
| S10 | | 16.374 | 0.471 | | | |
| S11 | Lens 6 | 3.958 | 0.608 | 1.567 | 38.0 | 7.860 |
| S12 | | 31.776 | 1.110 | | | |
| S13 | Lens 7 | 7.847 | 0.517 | 1.535 | 56.1 | −4.796 |
| S14 | | 1.895 | 0.227 | | | |
| S15 | IR-cut | Infinity | 0.110 | 1.518 | 64.2 | |
| S16 | filter | Infinity | 0.739 | | | |
| S17 | image | Infinity | −0.004 | | | |

An overall focal length f of the optical imaging system according to the eighth example embodiment of the present disclosure may be 6.312 mm, a field of view (FOV) of the optical imaging system may be 85.3°, OAL may be 7.09 mm, and IMH may be 6.12 mm.

Table 16 shows aspherical surface values of the optical imaging system according to the eighth example embodiment of the present disclosure. For example, both object-side surfaces and image-side surfaces of the first lens 810 to the seventh lens 870 may be aspherical surfaces.

TABLE 16

| Surface | S1 | S2 | S3 | S4 | S5 | S6 | S7 |
|---|---|---|---|---|---|---|---|
| K | −0.607761 | −6.326784 | 12.907711 | 3.087856 | 17.429982 | 0.014396 | −2.516747 |
| A | 0.014282 | −0.019245 | −0.021608 | 0.005232 | −0.012603 | 0.008812 | −0.057030 |
| B | −0.063997 | 0.095535 | 0.126902 | −0.188540 | −0.107409 | −0.281008 | 0.248638 |
| C | 0.217947 | −0.347030 | −0.807385 | 1.276132 | 1.051751 | 1.602433 | −1.404692 |
| D | −0.457721 | 0.714147 | 3.146738 | −4.832983 | −5.061750 | −5.367068 | 4.849482 |
| E | 0.669802 | −0.793901 | −7.627436 | 11.825664 | 14.508071 | 11.494112 | −11.49388 |
| F | −0.715764 | 0.320708 | 12.289817 | −19.64394 | −27.188059 | −16.666316 | 19.489807 |
| G | 0.567935 | 0.338611 | −13.728286 | 22.690362 | 34.910893 | 16.917679 | −24.14707 |
| H | −0.334895 | −0.630543 | 10.877646 | −18.37915 | −31.432974 | 12.265998 | 22.021067 |
| J | 0.145497 | 0.490751 | −6.162923 | 10.374896 | 19.979767 | 6.436132 | −14.72581 |
| L | −0.045761 | −0.231555 | 2.481507 | −3.981115 | −8.891561 | −2.468950 | 7.111745 |
| M | 0.010103 | 0.070350 | −0.693721 | 0.981786 | 2.697913 | 0.696688 | −2.406335 |
| N | −0.001482 | −0.013513 | 0.128034 | −0.136968 | −0.528220 | −0.142528 | 0.539530 |
| O | 0.000130 | 0.001499 | −0.014031 | 0.007149 | 0.059577 | 0.019422 | −0.071792 |
| P | −0.000005 | −0.000073 | 0.000691 | 0.000234 | −0.002896 | −0.001320 | 0.004280 |

| | S8 | S9 | S10 | S11 | S12 | S13 | S14 |
|---|---|---|---|---|---|---|---|
| K | 0.000015 | 91.001965 | −5.922330 | −18.28889 | −1.191658 | −6.698995 | −9.189887 |
| A | −0.006554 | −0.078545 | −0.121306 | −0.009502 | −0.005208 | −0.169274 | −0.067970 |
| B | −0.323707 | −0.067179 | 0.061705 | 0.007650 | 0.015195 | 0.087934 | 0.027101 |
| C | 1.772584 | 0.562616 | 0.010569 | −0.024907 | −0.022031 | −0.036106 | −0.007877 |
| D | −5.504531 | −1.472856 | −0.078133 | 0.027850 | 0.015949 | 0.011112 | 0.001525 |
| E | 10.949812 | 2.295944 | 0.092165 | −0.020081 | −0.008033 | −0.002407 | −0.000180 |
| F | −14.87574 | −2.382475 | −0.054263 | 0.009927 | 0.003009 | 0.000367 | 0.000009 |
| G | 14.279923 | 1.725523 | 0.013700 | −0.003421 | −0.000844 | −0.000040 | 0.000001 |
| H | −9.851563 | −0.894370 | 0.002676 | 0.000825 | 0.000176 | 0.000003 | 0.000000 |
| J | 4.903619 | 0.335321 | −0.003365 | −0.000139 | −0.000027 | 0.000000 | 0.000000 |
| L | −1.745343 | −0.090701 | 0.001243 | 0.000016 | 0.000003 | 0.000000 | 0.000000 |
| M | 0.433153 | 0.017366 | −0.000256 | −0.000001 | 0.000000 | 0.000000 | 0.000000 |
| N | −0.071188 | −0.002249 | 0.000031 | 0.000000 | 0.000000 | 0.000000 | 0.000000 |
| O | 0.006964 | 0.000178 | −0.000002 | 0.000000 | 0.000000 | 0.000000 | 0.000000 |
| P | −0.000307 | −0.000007 | 0.000000 | 0.000000 | 0.000000 | 0.000000 | 0.000000 |

Figure 16:
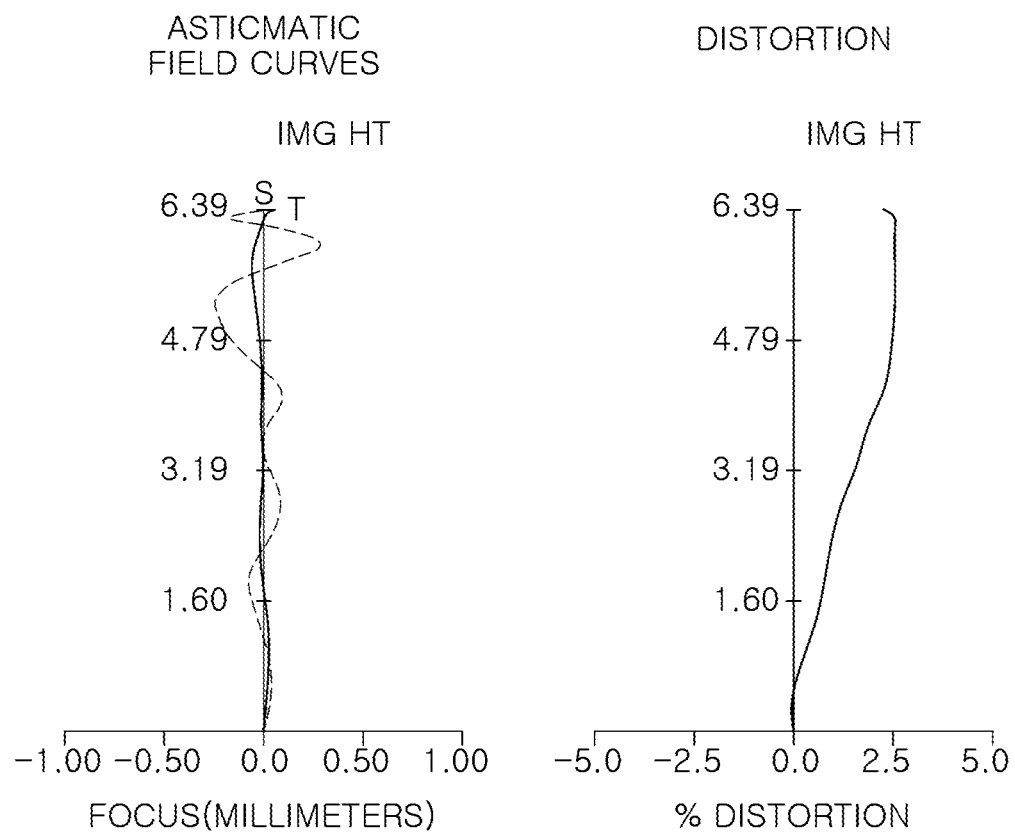
FIG. 16 is a graph illustrating an aberration curve of the optical imaging system illustrated in FIG. 15.

In addition, the optical imaging system according to the eighth example embodiment of the present disclosure configured as described above may have the aberration properties illustrated in FIG. 16.

Table 17 shows conditional expression values of an optical imaging system according to the first to eighth example embodiments.

TABLE 17

| Conditional expression | Ex1 | Ex2 | Ex3 | Ex4 | Ex5 | Ex6 | Ex7 | Ex8 |
|---|---|---|---|---|---|---|---|---|
| f1/f | 0.87 | 0.88 | 0.92 | 0.88 | 0.88 | 0.88 | 0.93 | 0.89 |
| v1-v2 | 37.70 | 37.70 | 37.70 | 37.70 | 37.70 | 37.70 | 37.70 | 37.70 |
| v1-v4 | 37.70 | 37.70 | 37.70 | 37.70 | 37.70 | 37.70 | 37.70 | 37.70 |
| v1-v6 | 18.10 | 18.10 | 18.10 | 18.10 | 18.10 | 18.10 | 18.10 | 18.10 |
| f2/f | −2.64 | −2.62 | −2.63 | −2.7 | −2.69 | −2.64 | −2.72 | −2.52 |
| f3/f | 4.68 | 5.10 | 4.39 | 5.62 | 5.09 | 5.36 | 3.91 | 3.76 |
| f4/f | −5.70 | −6.55 | −5.03 | −5.15 | −4.82 | −4.89 | −4.73 | −3.91 |
| f5/f | −7.23 | −5.03 | −13.72 | −7.73 | −10.93 | −13.45 | −9.29 | −8.17 |
| f6/f | 1.43 | 1.33 | 1.21 | 1.41 | 1.42 | 1.41 | 1.23 | 1.25 |
| f7/f | −0.88 | −0.90 | −0.73 | −0.92 | −0.86 | −0.87 | −0.77 | −0.76 |
| OAL/f | 1.13 | 1.13 | 1.12 | 1.12 | 1.12 | 1.12 | 1.12 | 1.12 |
| f1/f2 | −0.33 | −0.33 | −0.35 | −0.33 | −0.33 | −0.33 | −0.34 | −0.35 |
| f1/f3 | 0.19 | 0.17 | 0.21 | 0.16 | 0.17 | 0.16 | 0.24 | 0.24 |
| BFL/f | 0.17 | 0.17 | 0.17 | 0.17 | 0.17 | 0.17 | 0.17 | 0.17 |
| D1/f | 0.02 | 0.02 | 0.02 | 0.02 | 0.02 | 0.02 | 0.02 | 0.02 |
| OAL/2IMH | 0.58 | 0.58 | 0.58 | 0.58 | 0.58 | 0.58 | 0.58 | 0.58 |
| FOV*2IMH/f | 166.23 | 166.21 | 165.02 | 165.39 | 165.43 | 165.39 | 164.98 | 165.39 |

According to example embodiments of the present disclosure, an optical imaging system may implement high resolution while having a reduced thickness compared to a conventional optical imaging system.

While specific examples have been shown and described above, it will be apparent after an understanding of this disclosure that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An optical imaging system comprising:
a first lens, a second lens, a third lens, a fourth lens, a fifth lens, a sixth lens, and a seventh lens disposed in sequence to be spaced apart from an object side,
wherein the second lens, the fourth lens, and the fifth lens have a refractive index of 1.6 or more, and
wherein the optical imaging system satisfies the following conditional expressions:

$OAL/2IMH<0.6$, $-10<f4/f<0$, and $0<f6/f<1.5$, where OAL is a distance from an object-side surface of the first lens to an image plane, and 2IMH is a diagonal length of the image plane, f4 is a focal length of the fourth lens, f is an overall focal length of the optical imaging system, and f6 is a focal length of the sixth lens.

2. The optical imaging system of claim 1, wherein the second lens, the fourth lens, and the fifth lens have negative refractive power.

3. The optical imaging system of claim 1, wherein the second lens has a convex object-side surface, and a concave image-side surface, and the optical imaging system satisfies the following conditional expression:

$-10<f2/f<0$, where f2 is a focal length of the second lens, and f is an overall focal length of the optical imaging system.

4. The optical imaging system of claim 1, wherein the optical imaging system satisfies the following conditional expressions:

$0<f1/f<1.4$ and $0<f1/f3<0.4$, where f1 is a focal length of the first lens, f is an overall focal length of the optical imaging system, and f3 is a focal length of the third lens.

5. The optical imaging system of claim 1, wherein the sixth lens has a convex object-side surface.

6. The optical imaging system of claim 1, wherein the seventh lens has a convex object-side surface and a concave image-side surface, and the optical imaging system satisfies the following conditional expression:

$-0.95<f7/f<0$, where f7 is a focal length of the seventh lens, and f is an overall focal length of the optical imaging system.

7. The optical imaging system of claim 1, wherein the optical imaging system satisfies the following conditional expression:

$15<v1-v6<25$, where v1 is an Abbe number of the first lens, and v6 is an Abbe number of the sixth lens.

8. The optical imaging system of claim 1, wherein the optical imaging system satisfies the following conditional expressions:

$BFL/f<0.3$ and $D1/f<0.1$, where BFL is a distance from an image-side surface of the seventh lens to an image plane, f is an overall focal length of the optical imaging system, and D1 is a distance from an image-side surface of the first lens to an object-side surface of the second lens.

9. The optical imaging system of claim 1, wherein the optical imaging system satisfies the following conditional expression:

$FOV*2IMH/f<170°$, where FOV is a field of view of the optical imaging system, 2IMH is a diagonal length of an image plane, and f is an overall focal length of the optical imaging system.

10. An optical imaging system comprising:
a first lens having positive refractive power, a second lens having negative refractive power, a third lens having positive refractive power, a fourth lens having negative refractive power, a fifth lens having negative refractive power, a sixth lens having positive refractive power, and a seventh lens having negative refractive power,
wherein the first to seventh lenses are disposed in sequence to be spaced apart from an object side, and
wherein the optical imaging system satisfies the following conditional expressions:

$OAL/2IMH < 0.6$ and $-10 < f4/f < 0$, where OAL is a distance from an object-side surface of the first lens to an image plane, 2IMH is a diagonal length of the image plane, f4 is a focal length of the fourth lens, and f is an overall focal length of the optical imaging system.

11. The optical imaging system of claim 10, wherein the optical imaging system satisfies the following conditional expression:

$15 < v1 - v6 < 25$ where v1 is an Abbe number of the first lens, and v6 is an Abbe number of the sixth lens.

12. The optical imaging system of claim 10, wherein the optical imaging system satisfies the following conditional expressions:

$OAL/f < 1.3$ and $D1/f < 0.1$, where OAL is a distance from an object-side surface of the first lens to an image plane, f is an overall focal length of the optical imaging system, and D1 is a distance from an image-side surface of the first lens to an object-side surface of the second lens.

13. The optical imaging system of claim 10, wherein the optical imaging system satisfies the following conditional expression:

$FOV * 2IMH/f < 170°$, where FOV is a field of view of the optical imaging system, 2IMH is a diagonal length of an image plane, and f is an overall focal length of the optical imaging system.

14. The optical imaging system of claim 10, wherein the optical imaging system satisfies the following conditional expressions:

$0 < f1/f3 < 0.4$ and $0 < f6/f < 1.5$, where f1 is a focal length of the first lens, f3 is a focal length of the third lens, f6 is a focal length of the sixth lens, and f is an overall focal length of the optical imaging system.

15. The optical imaging system of claim 10, wherein the second lens, the fourth lens, and the fifth lens have a refractive index of 1.6 or more.

16. An optical imaging system comprising:
a first lens, a second lens, a third lens, a fourth lens, a fifth lens, a sixth lens, and a seventh lens disposed in sequence from an object side,
wherein the optical imaging system satisfies the following conditional expressions:

$OAL/2IMH < 0.6$ and $0 < f6/f < 1.5$, where OAL is a distance from an object-side surface of the first lens to an image plane, 2IMH is a diagonal length of the image plane, f6 is a focal length of the sixth lens, and f is an overall focal length of the optical imaging system, and
wherein the optical imaging system satisfies one or more of the following conditional expressions:

$0 < f1/f3 < 0.4$ and $OAL/f < 1.3$, where f1 is a focal length of the first lens and f3 is a focal length of the third lens.

17. The optical imaging system of claim 16, wherein the second lens, the fourth lens, and the fifth lens have a refractive index of 1.6 or more.

18. The optical imaging system of claim 16, wherein the optical imaging system satisfies the following conditional expression:

$-0.6 < f1/f2 < 0$, where f1 is a focal length of the first lens and f2 is a focal length of the second lens.

19. The optical imaging system of claim 16, wherein
the second lens has a convex object-side surface and a concave image-side surface,
the third lens has a convex object-side surface, and
the seventh lens has a convex object-side surface.

* * * * *